US005767727A

United States Patent [19]

Kimura

[11] Patent Number: 5,767,727

[45] **Date of Patent: *Jun. 16, 1998**

[54] TRIPPLER AND QUADRUPLER OPERABLE AT A LOW POWER SOURCE VOLTAGE OF THREE VOLTS OR LESS

[75] Inventor: Katsuji Kimura, Tokyo, Japan

[73] Assignee: NEC Corporation, Tokyo, Japan

[ * ] Notice: The term of this patent shall not extend beyond the expiration date of Pat. No. 5,640,121.

[21] Appl. No.: 840,163

[22] Filed: Apr. 14, 1997

Related U.S. Application Data

[60] Continuation of Ser. No. 449,012, May 24, 1995, abandoned, which is a division of Ser. No. 331,173, Oct. 28, 1994, abandoned.

[30] Foreign Application Priority Data

Oct. 29, 1993 [JP] Japan .................................... 5-272663

[51] Int. Cl.[6] ........................................................ G06F 7/44

[52] U.S. Cl. .......................... 327/359; 327/356; 330/252

[58] Field of Search .................................... 327/356, 355, 327/357, 359, 360, 362, 306, 534, 387, 390, 113, 114; 455/326

[56] References Cited

U.S. PATENT DOCUMENTS

| | | | |
|---|---|---|---|
| 3,838,262 | 9/1974 | Van De Plassche | 235/194 |
| 3,956,643 | 5/1976 | Hite | 327/357 |
| 4,308,471 | 12/1981 | Misawa | 327/356 |
| 4,388,540 | 6/1983 | Schreurs | 327/356 |
| 4,572,975 | 2/1986 | Bowers | 327/359 |

(List continued on next page.)

FOREIGN PATENT DOCUMENTS

| | | | |
|---|---|---|---|
| 52-61945 | 5/1977 | Japan | 327/356 |
| 3-210683 | 9/1991 | Japan . | |
| 4-34673 | 2/1992 | Japan . | |
| 4-309190 | 10/1992 | Japan . | |

OTHER PUBLICATIONS

Choma, J., Jr., "A Three–Level Broad–Banded Monolithic Analog Multiplier", *IEEE Journal of Solid-State Circuits*, vol. SC–16, No. 4, Aug., 1981, pp. 392–399.

Kimura, K., "A Unified Analysis of Four–Quadrant Analog Multipliers Consisting of Emitter and Source–Coupled Transistors Operable on Low Supply Voltage", *IEICE Trans. Electron*, vol. E76–C, No. 5, May, 1993, pp. 714–737.

Kimura, K., "A Bipolar Four–Quadrant Analog Quarter–Square Multiplier Consisting of Unbalanced Emitter–Coupled Pairs and Expansions of Its Input Ranges", *IEEE Journal of Solid–State Circuits*, vol. 29, No. 1, Jan., 1994, pp. 46–55.

Kimura, K., "Some Circuits Design Techniques Using Two Cross–Coupled, Emitter–Coupled Pairs", *IEEE Transactions on Circuits and Systems*, vol. 41, No. 5, May, 1994, pp. 410–423.

*Primary Examiner*—Kenneth B. Wells
*Attorney, Agent, or Firm*—Young & Thompson

[57] ABSTRACT

A tripler for multiplying three input signals operable at a low power source voltage such as 3 V or less, which contains a first emitter-coupled pair of first and second bipolar transistors, a second emitter-coupled pair of third and fourth bipolar transistors, and a multiplier. Collectors of the first and third transistors are coupled together and those of the second and fourth transistors are coupled together. A tripler output is derived from the collectors coupled of the first and third transistors and those of the second and fourth transistors. Bases of the first and fourth transistors are coupled together and those of the second and third transistors are coupled together. A first input voltage is applied across the bases coupled of the first and is fourth transistors and those of the second and third transistors. The multiplier has a second pair of input ends to be applied with a second input voltage, a third pair of input ends to be applied with a third input voltage, and a pair of output ends from which a differential output current of the multiplier is derived. The first and second emitter-coupled pairs are driven by the differential output current of the multiplier.

4 Claims, 16 Drawing Sheets

U.S. PATENT DOCUMENTS 4,586,155 4/1986 Gilbert .................................... 364/841
4,642,490 2/1987 Lawton .................................... 327/356
4,694,204 9/1987 Nishijima et al. .......................... 327/359
5,086,241 2/1992 Nakayama ................................ 327/349
5,311,086 5/1994 Yamaji et al. ............................. 327/356
5,389,840 2/1995 Dow ........................................ 327/356
5,438,296 8/1995 Kimura .................................... 327/356
5,640,121 6/1997 Kimura .................................... 327/359

TRIPPLER AND QUADRUPLER OPERABLE AT A LOW POWER SOURCE VOLTAGE OF THREE VOLTS OR LESS

This application is a continuation of application Ser. No. 08/449,012, filed May 24, 1995, now abandoned, which is a divisional application of Ser. No. 08/331,173, filed on Oct. 28, 1994, also now abandoned.

BACKGROUND OF THE INVENTION

1. Field of the Invention

The present invention relates to a multiplier for multiplying three input signals or more, and more particularly, to a tripler for multiplying three input signals and a quadruplet for multiplying four input signals, both of which are formed on semiconductor integrated circuits and are operable under a low power source voltage such as 3 V or less.

2. Description of the Prior Art

A conventional tripler is composed of a differential circuit and emitter-coupled pairs of bipolar transistors whose collectors are cross-coupled with each other. The emitter-coupled pairs are cascaded at a multistage and the differential circuit is connected in series to the first or last stage of the emitter-coupled pairs.

A conventional quadrupler is similar in configuration to the conventional tripler described above excepting that an additional emitter-coupled pair is provided.

One of the conventional triplers is disclosed in detail in Into Journal of Solid-State Circuits, VOL. SC-16, NO. 4, pp. 392–399, May 1981, which is shown in FIG. 1.

As shown in FIG. 1, the conventional tripler TP20 contains a first pair of npn bipolar transistors Q21 and Q22, a second pair of npn bipolar transistors Q23 and Q24, a third pair of npn bipolar transistors Q25 and Q26, a fourth pair of npn bipolar transistors Q27 and Q28, a fifth pair of npn bipolar transistors Q29 and Q30, and a constant current source CS0 (current: $I_0$).

In a first stage, emitters of the transistors Q21 and Q22 are coupled together and emitters of the transistors Q23 and Q24 are coupled-together. Collectors of the transistors Q21 and Q23 are connected to each other and collectors of the transistors Q22 and Q24 are connected to each other.

A differential output current $\Delta I_{OUT20}$ of the tripler TP20 is derived from the collectors thus connected of the transistors Q21 and Q23 and those of the transistors Q22 and Q24.

Bases of the transistors Q22 and Q23 are coupled together, and bases of the transistors Q21 and Q24 are coupled together. A first input voltage $V_1$ is applied across the coupled bases of the transistors Q22 and Q23 and those of the transistors Q21 and Q24.

In a second stage, similarly, emitters of the transistors Q25 and Q26 are coupled together and emitters of the transistors Q27 and Q28 are coupled together. Collectors of the transistors Q25 and Q27 are connected to each other and collectors of the transistors Q26 and Q28 are connected to each other. The coupled collectors of the transistors Q25 and Q27 are connected to the coupled emitters of the transistors Q21 and Q22. The coupled collectors of the transistors Q26 and Q28 are connected to the coupled emitters of the transistors Q23 and Q24.

Bases of the transistors Q25 and Q28 are coupled together and bases of the transistors Q26 and Q27 are coupled together. A second input voltage $V_2$ is applied across the coupled bases of the transistors Q22 and Q23 and those of the transistors Q21 and Q24.

In a third stage, emitters of the transistors Q29 and Q30 are coupled together to be connected to the constant current source CS0. Bases of the transistors Q29 and Q30 are applied with a third input voltage $V_3$. A collector of the transistor Q29 is connected to the coupled emitters of the transistors Q25 and Q26. A collector of the transistor Q30 is connected to the coupled emitters of the transistors Q27 and Q28.

The third, fourth and fifth emitter-coupled pairs of the transistors Q25, Q26, Q27, Q28, Q29 and Q30 constitute the well known Gilbert multiplier cell. Therefore, it can be said that the conventional tripler TP20 in FIG. 1 is composed of the multiplier and first and second emitter-coupled pairs whose collectors are crossly coupled with each other.

An output differential current $\Delta I_{20}$ of the Gilbert cell multiplier MP20 is derived between the collectors connected of the transistors Q25 and Q27 and those of the transistors Q26 and Q28.

The output differential current $\Delta I_{OUT20}$ of the tripler is expressed by the following equation (1) as $$\Delta I_{OUT} = \alpha_{Fn}(\Delta I_{20})\tanh\left(\frac{V_1}{2V_T}\right) \tag{1}$$

In the equation (1), $\alpha_{Fn}$ is the dc comon-base current gain factor of an npn bipolar transistor, and $V_T$ is the thermal voltage that is expressed as $V_T=kT/q$ where k is Boltzmann's constant, T is absolute temperature in degrees Kelvin and q is the charge of an electron.

The differential output current $\Delta I_{20}$ of the Gilbert cell multiplier MP20 is expressed by the following equation (2) as $$\Delta I_{20} = \alpha_{Fn}^2 I_0 \tanh\left(\frac{V_2}{2V_T}\right)\tanh\left(\frac{V_3}{2V_T}\right) \tag{2}$$

Therefore, the output differential current $\Delta I_{OUT20}$ of the tripler can be expressed by the following equation (3) as $$\Delta I_{OUT20} = \alpha_{Fn}^3 I_0 \tanh\left(\frac{V_1}{2V_T}\right)\tanh\left(\frac{V_2}{2V_T}\right)\tanh\left(\frac{V_3}{2V_T}\right) \tag{3}$$

Here, since tanhx can be approximated in small signal applications as $\tanh x = x-(1/3)x^3 \ldots \approx X(|x|<<1)$, the current $\Delta I_{OUT20}$ can be rewritten as the following equation (4)

$$\Delta I_{OUT20} = \left(\frac{\alpha_{Fn}^3 I_0}{(2V_T)^3}\right)V_1V_2V_3 \tag{4}$$

$$(|V_1| < 2V_T, |V_2| < 2V_T, |V_3| < 2V_T)$$

It is seen from the equation (4) that the differential output current $\Delta I_{OUT20}$ of the conventional tripler TP20 shown in FIG. 1 is proportional to the product or multiplication result of the three input voltage $V_1$, $V_2$ and $V_3$.

Since the conventional tripler TP20 has three vertically stacked stages of the bipolar transistors, the tripler needs at least about 4 V for the power source voltage to operate stably.

Next, one of the conventional quadruplers is disclosed in U.S. Pat. No. 4,694,204, which is shown in FIG. 2.

As shown in FIG. 2, the conventional quadrupler QP21 contains a first pair of npn bipolar transistors Q3 and Q32, a second pair of npn bipolar transistors Q33 and Q34, a third pair of npn bipolar transistors Q35 and Q36, a fourth pair of npn bipolar transistors Q37 and Q38, a fifth pair of npn bipolar transistors Q39 and Q40, a sixth pair of npn bipolar transistors Q41 and Q42, a seventh pair of npn bipolar transistors Q43 and Q44, and a constant current source CS0' (current: $I_0$).

In a first stage, emitters of the transistors Q31 and Q32 are coupled together and emitters of the transistors Q33 and Q34 are coupled together. Collectors of the transistors Q31 and Q33 are connected to each other and collectors of the transistors Q32 and Q34 are connected to each other.

An output differential current $\Delta I_{OUT21}$ of the quadrupler QP21 is derived from the collectors thus connected of the transistors Q31 and Q33 and those of the transistors Q32 and Q34.

Bases of the transistors Q32 and Q33 are coupled together and bases of the transistors Q31 and Q34 are coupled together. A first input voltage $V_1$ is applied across the coupled bases of the transistors Q32 and Q33 and those of the transistors Q31 and Q34.

In a second stage, similarly, emitters of the transistors Q35 and Q36 are coupled together and emitters of the transistors Q37 and Q38 are coupled together. Collectors of the transistors Q35 and Q37 are connected to each other and collectors of the transistors Q36 and Q38 are connected to each other. The coupled collectors of the transistors Q35 and Q37 are connected to the coupled emitters of the transistors Q31 and Q32, respectively. The coupled collectors of the transistors Q36 and Q38 are connected to the coupled emitters of the transistors Q33 and Q34, respectively.

Bases of the transistors Q35 and Q38 are coupled together and bases of the transistors Q36 and Q37 are coupled together. A second input voltage $V_2$ is applied across the coupled bases of the transistors Q32 and Q33 and those of the transistors Q31 and Q34.

In a third stage, emitters of the transistors Q39 and Q40 are coupled together and emitters of the transistors Q41 and Q42 are coupled together. Collectors of the transistors Q39 and Q41 are connected to each other and collectors of the transistors Q40 and Q42 are connected to each other. The coupled collectors of the transistors Q39 and Q41 are connected to the coupled emitters of the transistors Q35 and Q36. The coupled collectors of the transistors Q40 and Q42 are connected to the coupled emitters of the transistors Q37 and Q38.

Bases of the transistors Q39 and Q42 are coupled together and bases of the transistors Q40 and Q41 are coupled together. A third input voltage $V_3$ is applied across the coupled bases of the transistors Q39 and Q42 and those of the transistors Q40 and Q41.

In a fourth stage, emitters of the transistors Q43 and Q44 are coupled together to be connected to a constant current source CS0' (current: $I_0$). Bases of the transistors Q43 and Q44 are applied with a fourth input voltage $V_4$. A collector of the transistor Q43 is connected to the coupled emitters of the transistors Q39 and Q40. A collector of the transistor Q44 is connected to the coupled emitters of the transistors Q41 and Q42.

The third, fourth, fifth, sixth and seventh emitter-coupled pairs of the transistors Q35, Q36, Q37, Q38, Q39, 40, Q41, Q42, Q43 and Q44 constitute a tripler TP21 that is the same in configuration as the conventional tripler TP20 shown in FIG. 1. Therefore, it can be said that the conventional quadrupler QP21 in FIG. 2 is composed of the conventional tripler TP20 shown in FIG. 1 and the first and second emitter-coupled pairs whose collectors are crossly coupled with each other.

An output differential current $\Delta I_{21}$ of the tripler TP21 is derived between the collectors connected of the transistors Q35 and Q37 and those of the transistors Q36 and Q38.

The output differential current $\Delta I_{OUT21}$ of the quadrupler QP21 is expressed by the following equation (1') as $$\Delta I_{OUT21} = \alpha_{Fn}(\Delta I_{21})\tanh\left(\frac{V_1}{2V_T}\right) \tag{1'}$$

The differential output current $\Delta I_{21}$ of the tripler TP21 in the equation (1') is expressed by the following equation (5) as $$\Delta I_{21} = \alpha_{Fn}^3 I_0 \tanh\left(\frac{V_2}{2V_T}\right)\tanh\left(\frac{V_3}{2V_T}\right)\tanh\left(\frac{V_4}{2V_T}\right) \tag{5}$$

Therefore, the differential output current $\Delta I_{OUT21}$ of the quadrupler QP21 is expressed by the following equation (6) as $$\Delta I_{OUT21} = \alpha_{Fn}^4 I_0 \tanh\left(\frac{V_1}{2V_T}\right)\tanh\left(\frac{V_2}{2V_T}\right)\tanh\left(\frac{V_3}{2V_T}\right)\tanh\left(\frac{V_4}{2V_T}\right) \tag{6}$$

Here, since tanhx can be approximated in small signal applications as $\tanh x = x-(1/3)x^3 \ldots \approx X(|x|<<1)$, $\Delta I_{OUT}$ can be rewritten to the following equation (7) as $$\Delta I_{OUT21} \approx \frac{\alpha_{Fn}^4 I_0}{(2V_T)^4} V_1V_2V_3V_4 \tag{7}$$

$$(|V_1| < 2V_T, |V2| < 2V_T, |V3| < 2V_T, |V4| < 2V_T)$$

It is seen from the equation (7) that the differential output current $\Delta I_{OUT21}$ of the conventional quadrupler qp21 shown in FIG. 2 is proportional to the product of the four input voltage $V_1$, $V_2$, $V_3$ and $V_4$.

Since the conventional quadrupler QP21 shown in FIG. 2 has four vertically stacked stages of the bipolar transistors, the quadrupler QP21 needs at least about 5 V for the power source voltage to operate stably.

SUMMARY OF THE INVENTION

An object of the present invention is to provide a tripler operable under a low power source voltage such as 3 V or less.

Another object of the present invention is to provide a quadrupler operable under a low power source voltage such as 3 V or less.

According to a first aspect of the present invention, a tripler is provided, which contains a first pair of first and second bipolar transistors whose emitters are coupled together, a second pair of third and fourth bipolar transistors whose emitters are coupled together, and a multiplier.

Bases of the first and fourth transistors are coupled together to form one end of a first pair of input ends. Bases of the second and third transistors are coupled together to form the other end of the first pair of input ends. A first input voltage is applied across the first pair of input ends.

Collectors of the first and third transistors are coupled together to form one of a first pair of output ends for the tripler. Collectors of the second and fourth transistors are coupled together to form the other of the first pair of output ends. A tripler output is derived from the first pair of output ends.

The multiplier has a second pair of input ends, a third pair of input ends, and a second pair of output ends. A second input voltage is applied across the second pair of input ends. A third input voltage is applied across the third pair of input ends. A differential output current of the multiplier showing the multiplication result of the second and third input voltages is derived from the second pair of output ends.

One of the second pair of output ends is connected to the emitters coupled of the first and second transistors and the other of the second pair of output ends is connected to the emitters coupled of the third and fourth transistors. The first and second pairs are driven by the differential output current of the multiplier.

The tripler output shows the multiplication result of the first, second and third input voltages.

In the tripler of the first aspect, any type of multipliers may be employed if they have differential output currents.

With the tripler of the first aspect of the present invention, the first pair of the first and second bipolar transistors composes a differential pair, and the first input voltage is applied across the bases of the first and second transistors. The second pair of the third and fourth bipolar transistors composes Another differential pair, and the first input voltage is applied across the bases of the third and fourth transistors in an opposite phase.

In addition, these two differential pairs are driven by the differential output current of the multiplier.

Therefore, the tripler output is proportional to the product of the first input voltage and the differential output current of the multiplier.

Here, the differential output current of the multiplier is proportional to the product of the second and third input voltages.

As a result, the tripler output is proportional to the product of the first, second and third input voltages, which means that the tripler output shows the multiplication result of the first, second and third input voltages.

If the multiplier is composed of a single stage of bipolar transistors, metal-oxide-semiconductor (MOS) transistors or the like, the tripler of the first aspect is composed of only two stages of transistors. Accordingly, the tripler can operate at a power source voltage of 3 V or less.

According to a second aspect of the present invention, another tripler is provided, which contains a first pair of first and second bipolar transistors whose emitters are coupled together, a second pair of third and fourth bipolar transistors whose emitters are coupled together, a first constant current source for driving the first pair, a second constant current source for driving the second pair, and a multiplier.

Bases of the first and fourth transistors are coupled together to form one end of a first pair of input ends. Bases of the second and third transistors are coupled together to form the other end of the first pair of input ends. A first input voltage is applied across the first pair of input ends.

Collectors of the first and third transistors are coupled together to form one of a first pair of output ends for the tripler. Collectors of the second and fourth transistors are coupled together to form the other of the first pair of output ends. A tripler output is derived from the first pair of output ends.

The first constant current source is connected to the emitters coupled of the first and second transistors. The second constant current source is connected to the emitters coupled of the third and fourth transistors. Supplying current values of the first and second constant current sources are the same.

The multiplier has a second pair of input ends, a third pair of input ends, and a second pair of output ends. A second input voltage is applied across the second pair of input ends. A third input voltage is applied across the third pair of input ends. A differential output current of the multiplier showing the multiplication result of the second and third input voltages is derived from the second pair of output ends.

One of the second pair of output ends is connected to the emitters coupled of the first and second transistors and the other of the second pair of output ends is connected to the emitters coupled of the third and fourth transistors.

The tripler output shows the multiplication result of the first, second and third input voltages.

In the tripler of the second aspect, any type of multipliers may be employed if they have differential output currents.

With the tripler of the second aspect of the present invention, because of the same reason as that of the first aspect, the tripler output is proportional to the product of the first, second and third input voltages, which means that the tripler output shows the multiplication result of the first, second and third input voltages.

In the tripler of the second aspect, since the emitters of the first and second transistors and those of the third and fourth transistors are connected to the second pair of output ends of the multiplier and the first and second constant current sources, the multiplier may be composed of a single stage of bipolar or MOS transistors or two stages thereof.

Therefore, if the multiplier is composed of a single stage or two stages of transistors, the tripler of the second aspect also can be composed of a single or two stages of transistors. Accordingly, the tripler can operate at a power source voltage of 3 V or less.

According to a third aspect of the present invention, a quadrupler is provided, which contains a first pair of first and second bipolar transistors whose emitters are coupled together, a second pair of third and fourth bipolar transistors whose emitters are coupled together, a first constant current source for driving the first pair, a second constant current source for driving the second pair, and a tripler.

Bases of the first and fourth transistors are coupled together to form one end of a first pair of input ends. Bases of the second and third transistors are coupled together to form the other end of the first pair of input ends. A first input voltage is applied across the first pair of input ends.

Collectors of the first and third transistors are coupled together to form one of a first pair of output ends for the quadrupler. Collectors of the second and fourth transistors are coupled together to form the other of the first pair of output ends. A quadrupler output is derived from the first pair of output ends.

The first constant current source is connected to the emitters coupled of the first and second transistors. The second constant current source is connected to the emitters coupled of the third and fourth transistors. Supplying current values of the first and second constant current sources are the same.

The tripler has a second pair of input ends, a third pair of input ends, a fourth pair of input ends, and a second pair of output ends. A second input voltage is applied across the second pair of input ends. A third input voltage is applied across the third pair of input ends. A fourth input voltage is applied across the fourth pair of input ends. A differential output current of the tripler showing the multiplication result of the second, third and fourth input voltages is derived from the second pair of output ends.

One of the second pair of output ends is connected to the emitters coupled of the first and second transistors and the other of the second pair of output ends is connected to the emitters coupled of the third and fourth transistors.

The quadrupler output shows the multiplication result of the first, second, third and fourth input voltages.

In the quadrupler of the third aspect, any type of triplers may be employed if they have differential output currents. However, the tripler of the above first or second aspect is preferably employed.

With the quadrupler of the third aspect of the present invention, the first pair of the first and second bipolar transistors and the second pair of the third and fourth bipolar transistors are the same in configuration as the tripler of the second aspect.

Therefore, the quadrupler output is proportional to the product of the first input voltage and the differential output current of the tripler.

Here, the differential output current of the tripler is proportional to the product of the second, third and fourth input voltages.

As a result, the quadrupler output is proportional to the product of the first, second, third and fourth input voltages, which means that the quadrupler output shows the multiplication result of the first, second, third and fourth input voltages.

In the quadrupler of the third aspect, similar to the tripler of the second aspect, the emitters of the first and second transistors and those of the third and fourth transistors are connected to the second pair of output ends of the tripler and the first and second constant current sources. Therefore, the tripler may be composed of a single, two or three stages of bipolar or MOS transistors.

Accordingly, if the tripler is composed of a single, two or three stages of transistors, the quadrupler of the third aspect can be composed of a single, two or three stages of transistors. As a result, the quadrupler can operate at a power source voltage of 3 V or less.

DETAILED DESCRIPTION OF THE EMBODIMENTS

Preferred embodiments of the present invention will be described below referring to FIGS. 3 to 16.

First Embodiment

Figure 3:
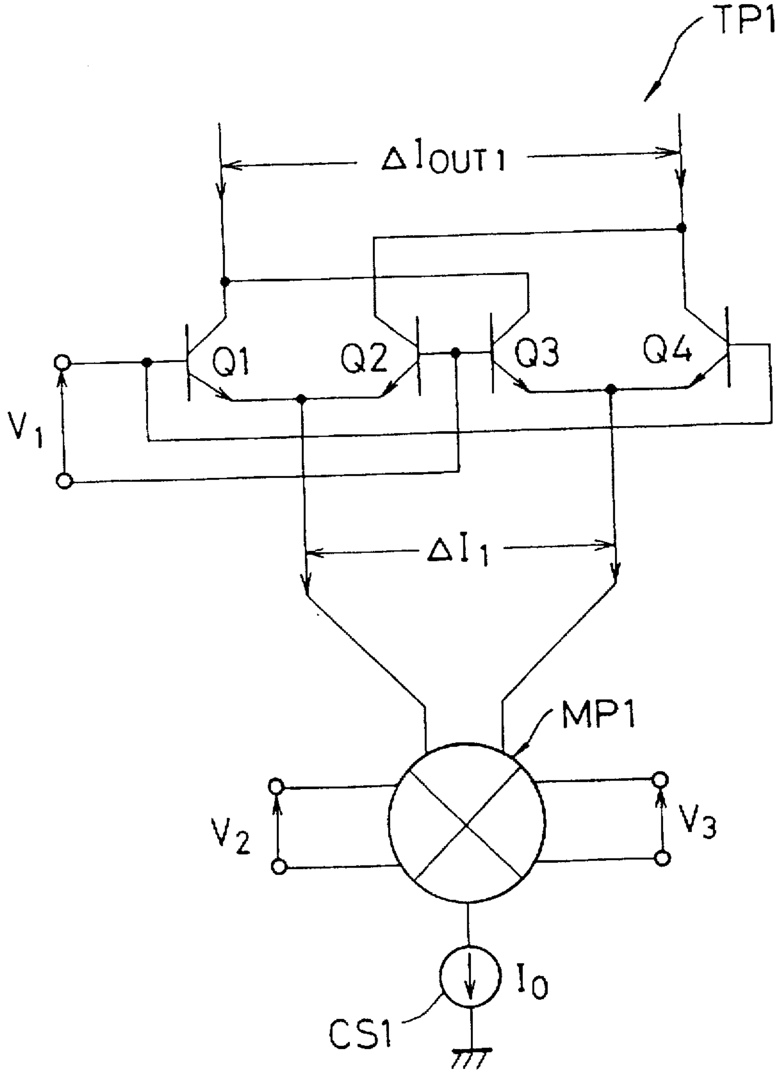
FIG. 3 is a schematic circuit diagram of a tripler according to a first embodiment of the invention.
Figure 4:
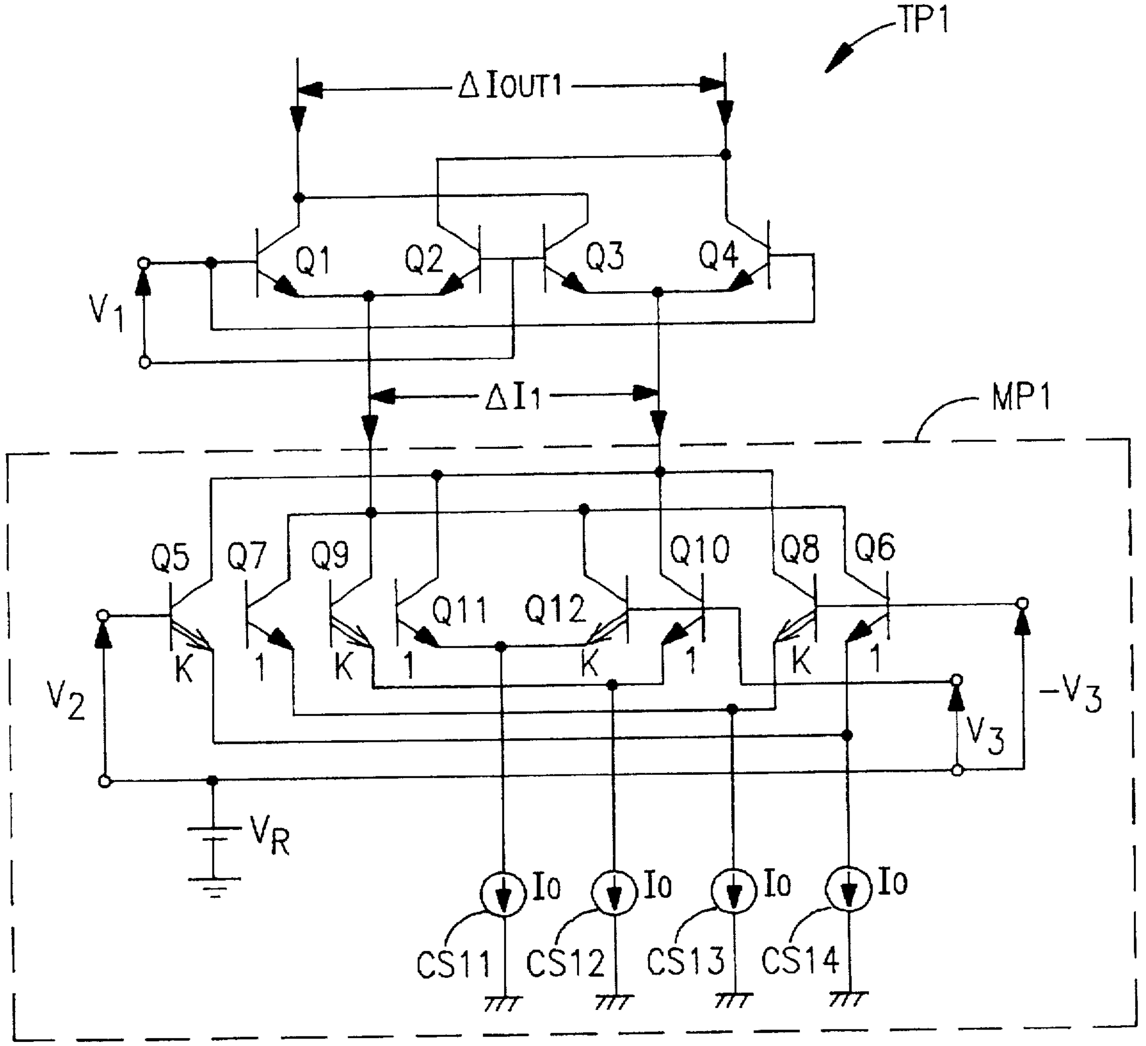
FIG. 4 is a circuit diagram of the tripler according to the first embodiment shown in FIG. 3.

FIGS. 3 and 4 show a tripler TP1 according to a first embodiment of the invention.

As shown in FIG. 3, the tripler TP1 is composed of a first pair of npn bipolar transistors Q1 and Q2 whose emitters are coupled together, a second pair of npn bipolar transistors Q3 and Q4 whose emitters are coupled together, and a multiplier MP1.

Bases of the transistors Q1 and Q4 are coupled together to form one of a first pair of input ends. Bases of the transistors Q2 and Q3 are coupled together to Form the other of the first pair of input ends. A first input voltage $V_1$ is applied across the first pair of input ends.

Collectors of the transistors Q1 and Q3 are coupled together to form one of a first pair of output ends for the tripler TP1. Collectors of the transistors Q2 and Q4 are coupled together to form the other of the first pair of output ends. A differential output current $\Delta I_{OUT1}$ of the tripler TP1 is derived from the first pair of output ends.

The multiplier MP1 has a second pair of input ends to be applied with a second input voltage $V_2$, a third pair of input ends, and a second pair of output ends to be applied with a third input voltage $V_3$, and a second pair of output ends from which a differential output current $\Delta I_1$ of the multiplier MP1 is derived. The current $\Delta I_1$ shows the multiplication result of the second and third input voltages $V_2$ and $V_3$.

One of the second pair of output ends of the multiplier MP1 is connected to the emitters coupled of the transistors Q1 and Q2 and the other thereof is connected to the emitters coupled of the transistors Q3 and Q4. The first and second emitter-coupled pairs are driven by the differential output current $\Delta I_1$ of the multiplier MP1.

The differential output current $\Delta I_{OUT1}$ is a tripler output and shows the multiplication result of the first, second and third input voltages $V_1$, $V_2$ and $V_3$.

The multiplier MP1 is driven by a constant current source CS1 whose constant current is $I_0$.

The differential output current $\Delta I_{OUT1}$ is expressed by the following equation (1") similar to the equation (1) as $$\Delta I_{OUT1} = \alpha_{F n}(\Delta I_1)\tanh\left(\frac{V_1}{2V_T}\right) \quad (1")$$

The differential output current $\Delta I_1$ of the multiplier $MP_1$ is dominated by a current component of the product of the second and third input voltages $V_2$ and $V_3$. Also, tanhx can be approximated in small signal applications as $\tanh x = x - (1/3)x^3 \ldots \approx X(|x|<<1)$. As a result, the differential output current $\Delta I_{OUT1}$ of the tripler TP1 is dominated by a current component of the product of the first, second and third input voltages $V_1$, $V_2$ and $V_3$. This means that the schematic circuit diagram in FIG. 3 shows a general tripler circuit.

FIG. 4 shows a concrete circuit of the multiplier MP1 in FIG. 3, which is disclosed in the Japanese Patent Application No. 4-72629 (the Japanese Non-Examined Patent Publication No. 5-94552, 1992) whose corresponding U.S. patent application is Ser. No. 08/179,955.

Additionally, some multipliers are disclosed in IEEE Journal of Solid State Circuits, Vol. 29, No. 1, pp 46–55, June, 1994 entitled "A Bipolar Four-Quadrant Analog Quarter-Square Multiplier Consisting of Unbalanced emitter Coupled Pairs and Expansions of its Input Ranges", and in IEICE Transactions on Electronics, Vol. E76-C, No. 5, pp 714–737, March 1993 entiteled "A Unified Analysis of Four-Quadrant Analog Multipliers Consisting of Emitter- and Source-Coupled Transistors Operable on Low Supply Voltage".

As shown in FIG. 4, the multiplier MP1 is composed of a third pair of npn bipolar transistors Q5 and Q6 whose emitters are connected in common to a constant current source CS14 (current: $I_0$), a fourth pair of npn bipolar transistors Q7 and Q8 whose emitters are connected in common to a constant current source CS13 (current: $I_0$), a fifth pair of npn bipolar transistors Q9 and Q10 whose emitters are connected in common to a constant current source CS12 (current: $I_0$), and a sixth pair of npn bipolar transistors Q11 and Q12 whose emitters are connected in common to a constant current source CS11 (current: $I_0$).

The third to sixth emitter-coupled pairs are driven by the corresponding current sources CS 11, CS12, CS13 and CS 14, respectively.

The third to sixth emitter-coupled pairs are each so-called unbalanced differential pairs. That is, the transistors Q5 is K times in emitter size or area as much as the transistor Q6, the transistors Q8 is K times in emitter size or area as much as the transistor Q7, the transistors Q9 is K times in emitter size or area as much as the transistor Q10, the transistors Q12 is K times in emitter size or area as much as the transistor Q11, where K>1.

Bases of the transistors Q5, Q7, Q9 and Q11 are coupled together. Bases of the transistors Q6 and Q8 are coupled together. Bases of the transistors Q10 and Q12 are coupled together. The sum of the second and third input voltage $V_2$ and $V_3$, or $(V_2+V_3)$, is applied across the bases coupled of the transistors Q5, Q7, Q9 and Q11 and the bases coupled of the transistors Q6 and Q8. The difference of the second and third input voltage $V_2$ and $V_3$, or $(V_2-V_3)$, is applied across the bases coupled of the transistors Q5, Q7, Q9 and Q11 and the bases coupled of the transistors Q10 and Q12.

Collectors of the transistors Q5, Q8, Q10 and Q11 are connected in common to the emitters coupled of the transistors Q3 and Q4. Collectors of the transistors Q6, Q7, Q9 and Q12 are connected in common to the emitters of the transistors Q1 and Q2. The differential output current $\Delta I_1$ of the multiplier MP1 is derived from the collectors connected of the transistors Q5, Q8, Q10 and Q11 and collectors connected of the transistors Q6, Q7, Q9 and Q12.

With the tripler TP1 of the first embodiment, the first emitter-coupled pair of the transistors Q1 and Q2 composes a differential pair, and the first input voltage $V_1$ is applied across the bases of the transistors Q1 and Q2. The second emitter-coupled pair of the transistors Q3 and Q4 composes another differential pair, and the first input voltage $V_1$ is applied across the bases of the transistors Q3 and Q4 in an opposite phase.

In addition, these two differential pairs are driven by the differential output current $\Delta I_1$ of the multiplier MP1.

Therefore, the differential output current $\Delta I_{OUT1}$ as the tripler output is proportional to the product of the first input voltage $V_1$ and the differential output current $\Delta I_1$ of the multiplier MP1.

Here, the differential output current of the multiplier MP1 is proportional to the product of the second and third input voltages $V_2$ and $V_3$.

As a result, the differential output current $\Delta I_{OUT1}$ is proportional to the product of the first, second and third input voltages $V_1$, $V_2$ and $V_3$, which means that the current $\Delta I_{OUT1}$ shows the multiplication result of the first, second and third input voltages $V_1$, $V_2$ and $V_3$.

The differential output current $\Delta I_{OUT1}$ of the tripler TP1 can be expressed by the following equation (8) as $$\Delta I_{OUT1} = 2\alpha_{Fn}^2 I_0 \tanh\left(\frac{V_1}{2V_T}\right)\{K-(1/K)\} \times \left\{\frac{1}{2\cosh A + K + (1/K)} - \frac{1}{2\cosh B + K + (1/K)}\right. \quad \left(A = \frac{(V_2+V_3)}{V_T}, B = \frac{(V_2-V_3)}{V_T}\right) \tag{8}$$

The equation (8) can be approximated as $$\Delta I_{OUT1} \approx \frac{-4\alpha_{Fn}^2 I_0\{K-(1/K)\}}{\{K+(1/K)+2\}^2} \times \left(\frac{V_1V_2V_3}{V_T^3}\right) \quad (A < 1, B < 1) \tag{9}$$

It is seen from the equation (9) that the differential output current $\Delta I_{OUT1}$ of the tripler TP1 shown in FIG. 4 is approximately proportional to the product or multiplication result of the three input voltage $V_1$, $V_2$ and $V_3$.

In the first embodiment, the multiplier M1 is composed of the single stage of the bipolar transistors Q5 to Q12 arranged horizontally along one line and the stage of the bipolar transistors Q1 to Q4, so that the tripler TP1 of the first embodiment is composed of only two stages of the bipolar transistors as a whole.

Accordingly, the tripler TP1 can operate at a power source voltage of about 2.8 V, which is satisfied with the demand for the power source voltage of 3 V or less.

Second Embodiment

Figure 5:
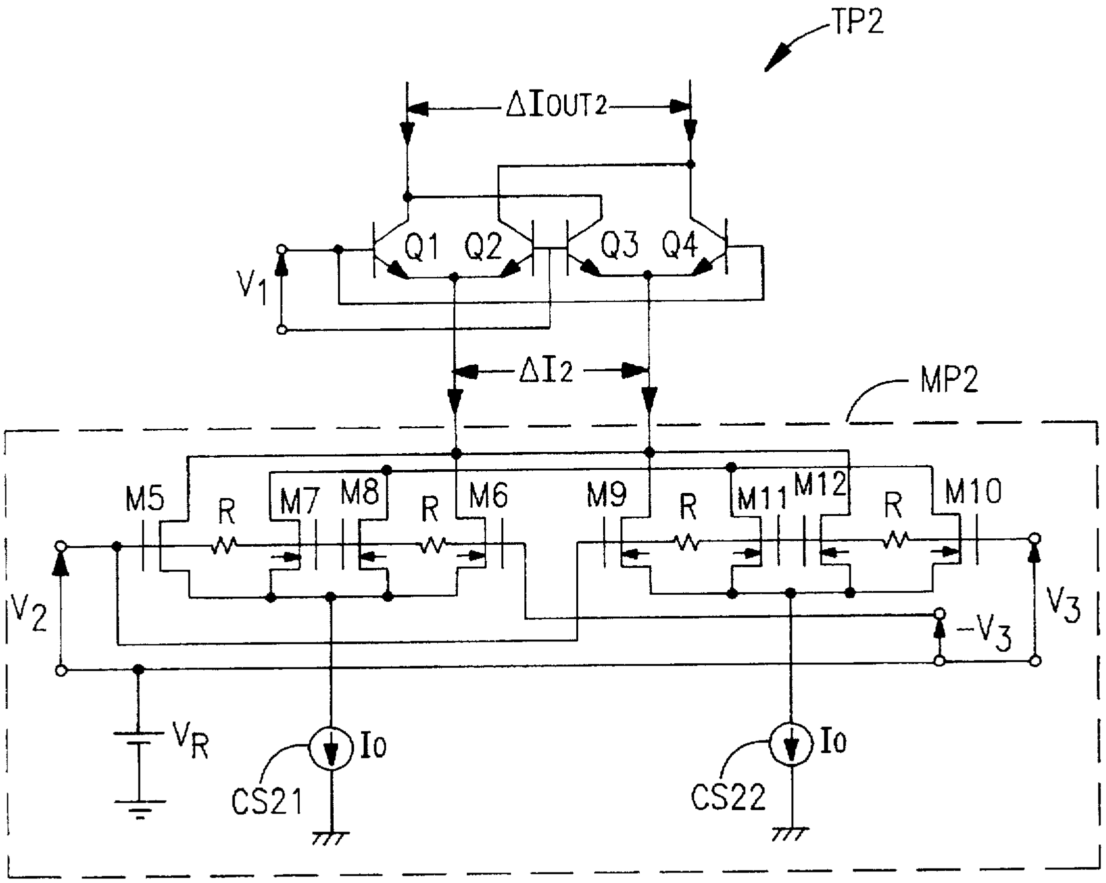
FIG. 5 is a circuit diagram of a tripler according to a second embodiment of the invention.

FIG. 5 shows a tripler TP2 according to a second embodiment of the invention.

As shown in FIG. 5, the tripler TP2 has the same first and second emitter-coupled pairs of the transistors Q1, Q2, Q3 and Q4 as those of the first embodiment. Only a multiplier MP2 of the tripler TP2 is different in configuration from that of the first embodiment.

The multiplier MP2 shown in FIG. 5 is disclosed in the Japanese Patent Application No. 5-176025 whose corresponding U.S. patent application Ser. No. 08/120,462.

As shown in FIG. 5, the multiplier MP2 is composed of a third pair of n-channel MOS transistors M5 and M6 whose sources are connected in common to a constant current source CS21 (current: $I_0$), a fourth pair of n-channel MOS transistors M7 and M8 whose sources are connected in common to the constant current source CS21, a fifth pair of n-channel MOS transistors M9 and Q10 whose sources are connected in common to a constant current source CS22 (current: $I_0$), and a sixth pair of n-channel MOS transistors M11 and M12 whose sources are connected in common to the constant current source CS22.

The third to sixth source-coupled pairs are driven by the corresponding current sources CS21 and CS 22, respectively.

The third to sixth source-coupled pairs are each so-called balanced differential pairs.

Gates of the transistors M5, M6, M7 and M8 are coupled together, and gates of the transistor M9, M10, M11 and M12 are coupled together. Between the gate coupled of the transistors M5 and M7, those of the transistors M6 and M8, those of the transistors M9 and M11, and those of the transistors M10 and M12, resistors (resistance: R) are connected respectively.

The sum of the second and third input voltage $V_2$ and $V_3$, or $(V_2+V_3)$, is applied across the gates coupled of the transistors M5, M6, M7 and M8. The difference of the second and third input voltage $V_2$ and $V_3$, or $(V_2-V_3)$, is applied across the gates coupled of the transistors M9, M10, M11 and M12.

Drains of the transistors M5, M6, M11 and M12 are connected in common to the emitter s coupled of the transistors Q1 and Q2. Drains of the transistors M7, M8, M9 and M10 are connected in common to the emitters of the transistors Q3 and Q4.

A differential output current $\Delta I_3$ of the multiplier MP2 is derived from the drains connected of the transistors M5, M6, M11 and M12 and the drains connected of the transistors M7, M8, M9 and M10.

The first and second emitter-coupled pairs are driven by the differential output current $\Delta I_2$ of the multiplier MP2.

A differential output current $\Delta I_{OUT2}$ of the tripler TP2 is derived from the collectors coupled of the transistors Q1 and Q3 and collectors coupled of the transistors Q2 and Q4.

The differential output current $\Delta I_{OUT2}$ of the tripler TP2 can be expressed by the following equation (10) as $$\Delta I_{OUT2} = 2\alpha_{F_n}\beta\tanh\left(\frac{V_1}{2V_T}\right)V_2V_3 \qquad (10)$$

$$\left(|V_2 \pm V_3| \leqq \sqrt{\left(\frac{2I_0}{3\beta}\right)}\right)$$

In the equation (10), $\beta$ is the transconductance parameter of the MOS transistor and is expressed as $\beta=\mu(Cox/2)(W/L)$ where $\mu$ is the effective mobility of a carrier, Cox is gate oxide capacitance per unit area, and W and L are a gate width and a gate length of the MOS transistor, respectively.

Since tanhx can be approximated in small signal application as $\tanh x = x-(1/3)x^3 \ldots \approx X(|x|<<1)$, it is seen from the equation (10) that the differential output current $\Delta I_{OUT2}$ is proportional the product of the three input voltages $V_1$, $V_2$ and $V_3$.

It is also seen from the equation (10) that this equation (10) is satisfied in the limited ranges of the second and third input voltages $V_2$ and $V_3$.

In the second embodiment, since the multiplier MP2 is realized by the MOS transistors, the input ranges of the voltages $V_2$ and $V_3$ are determined by the value of the transconductance parameter $\beta$ or (W/L) and the value of the driving currents $I_0$.

Also, there is an additional advantage of wider input ranges of the first, second and third input voltages $V_1$, $V_2$ and $V_3$ than those of the first embodiment.

Similar to the first embodiment, the multiplier MP2 is composed of the single stage of the MOS transistors M5 to M12 arranged horizontally along one line and the stage of the bipolar transistors Q1 to Q4, so that the tripler TP2 is composed of only two stages of the bipolar and MOS transistors as a whole.

Accordingly, the tripler TP2 also can operate at a power source voltage of about 2.8 V, which is satisfied with the demand for, the power source voltage of 3 V or less.

Any other multipliers with differential output currents may be used in the first and second embodiments. For example, multipliers disclosed in the Japanese Non-Examined Patent Publication No. 3-210683 (1991), 4-34673 (1992), 4-309190 (1992), the Japanese Patent Application No. 5-176025 (1993) and 5-19358 (1993). The Japanese Patent Application No. 5-19358 is corresponding to the U.S. patent application Ser. No. 08/179,955.

Third Embodiment

Figure 6:
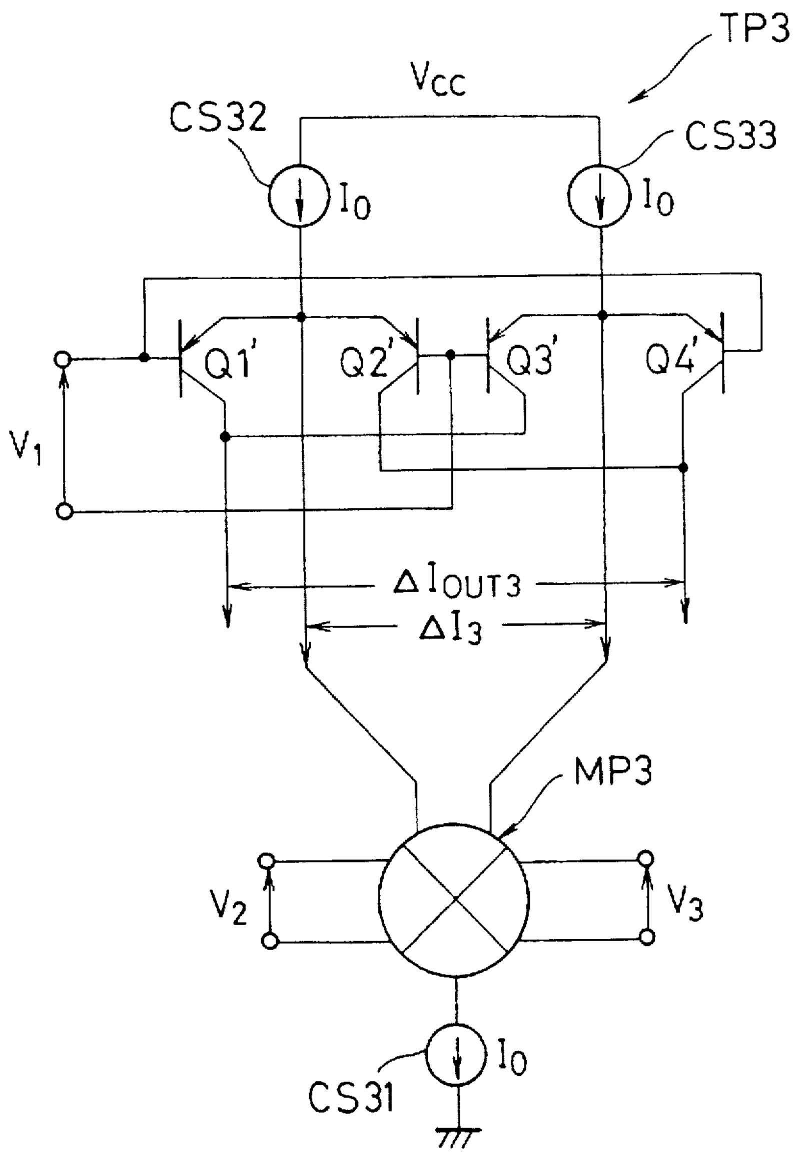
FIG. 6 is a schematic circuit diagram of a tripler according to a third embodiment.
Figure 7:
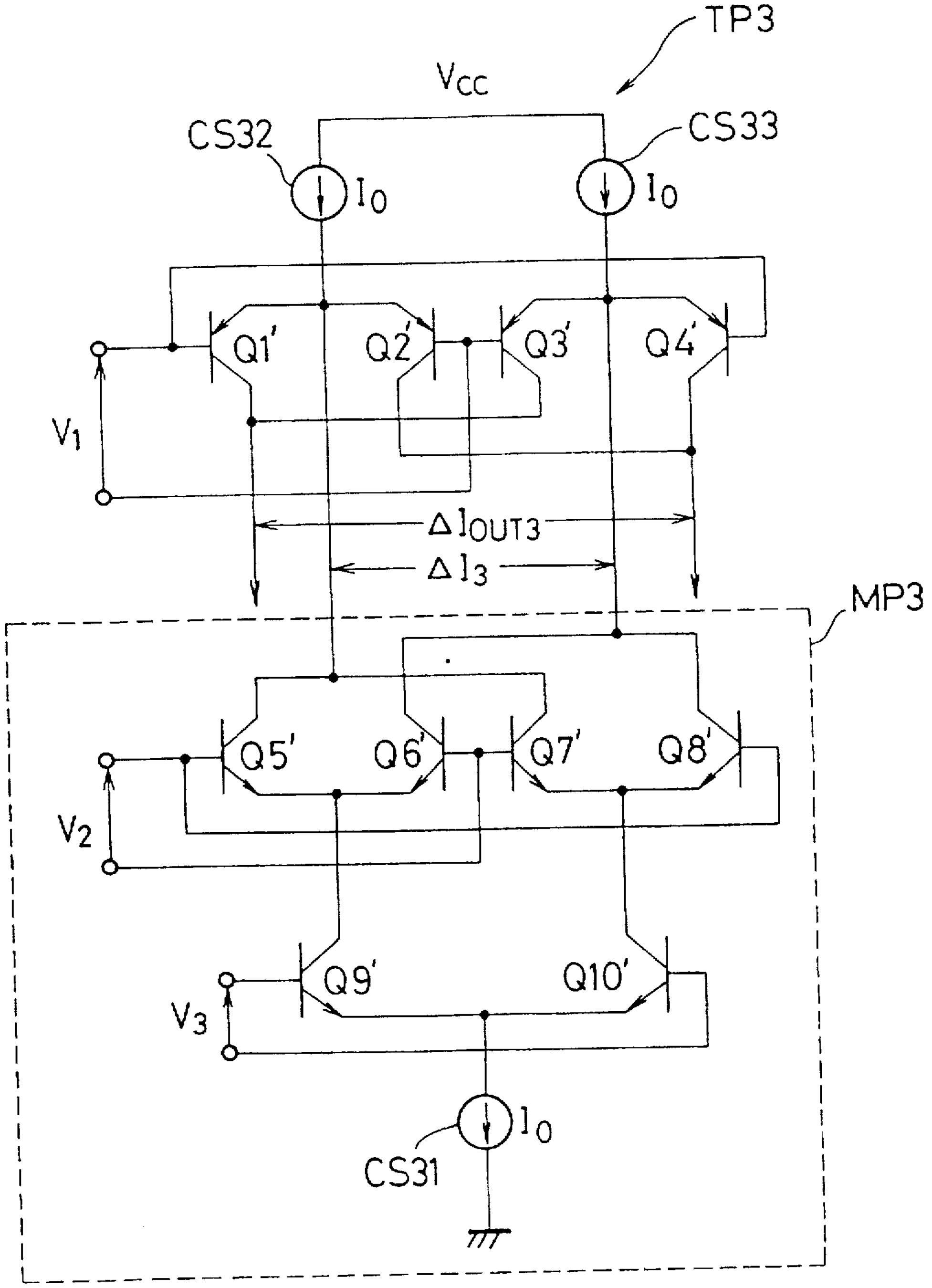
FIG. 7 is a circuit diagram of the tripler according to the third embodiment shown in FIG. 6.

FIGS. 6 and 7 show a tripler TP3 according to a third embodiment of the invention.

As shown in FIG. 6, the tripler TP3 is composed of a first pair of pnp bipolar transistors Q1' and Q2' whose emitters are coupled together, a second pair of pnp bipolar transistors Q3' and Q4' whose emitters are coupled together, and a multiplier MP3.

Bases of the transistors Q1' and Q4' are coupled together to form one of a first pair of input ends. Bases of the transistors Q2' and Q3' are coupled together to form the other of the first pair of input ends. A first input voltage $V_1$ is applied across the first pair of input ends.

Collectors of the transistors Q1' and Q3' are coupled together to form one of a first pair of output ends for the tripler TP3. Collectors of the transistors Q2' and Q4' are coupled together to form the other of the first pair of output ends.

A differential output current $\Delta I_{OUT3}$ of the tripler TP3 is derived from the first pair of output ends.

A constant current source (current: $I_0$) CS32 is connected between the emitters coupled of the transistors Q1' and Q2' and a power source (voltage: $V_{CC}$). A constant current source (current: $I_0$) CS33 is connected between the emitters coupled of the transistors Q3' and Q4' and a power source (voltage: $V_{CC}$).

The multiplier MP3 has a second pair or input ends to be applied with a second input voltage $V_2$, a third pair of input ends to be applied with a third input voltage $V_3$, and a second pair of output ends from which a differential output current $\Delta I_3$ of the multiplier MP3 is derived. The current $\Delta I_3$ shows the multiplication result of the second and third input voltages $V_2$ and $V_3$.

One of the second pair of output ends of the multiplier MP3 is connected to the emitters coupled of the transistors Q1' and Q2' and the other thereof is connected to the emitters coupled of the transistors Q3' and Q4'. The first and second emitter-coupled pairs are driven by the differential output current $\Delta I_3$ of the multiplier MP3.

The differential output current $\Delta I_{OUT3}$ is a tripler output and shows the multiplication result of the first, second and third input voltages $V_1$, $V_2$ and $V_3$.

The multiplier MP3 is driven by a constant current source CS31 whose constant current is $I_0$.

With the tripler TP3 of the third embodiment, the first emitter-coupled pair of the transistors Q1' and Q2' composes a differential pair, and the first input voltage $V_1$ is applied across the bases of the transistors Q1' and Q2' The second emitter-coupled pair of the transistors Q3' and Q4' composes another differential pair, and the first input voltage $V_1$ is applied across the bases of the transistors Q3' and Q4' in an opposite phase.

In addition, these two differential pairs are driven by the differential output current $\Delta I_3$ of the multiplier MP3.

Therefore, the differential output current $\Delta I_{OUT3}$ as the tripler output is proportional to the product of the first input voltage $V_1$ and the differential output current $\Delta I_3$ of the multiplier MP3.

Here, the differential output current of the multiplier MP3 is proportional to the product of the second and third input voltages $V_2$ and $V_3$.

As a result, the differential output current $\Delta I_{OUT3}$ is proportional to the product of the first, second and third input voltages $V_1$, $V_2$ and $V_3$, which means that the current $\Delta I_{OUT\ 3}$ shows the multiplication result of the first, second and third input voltages $V_1$, $V_2$ and $V_3$.

In the third embodiment, the first and second differential pairs of the transistors Q1', Q2', Q3' and Q4' are arranged between the pair of output ends of the multiplier MP3 and the current sources CS32 and CS 33. Then assuming that the differential output current $\Delta I_3$ is equal in value to the driving current $I_0$ of the current source CS31, the differential output current $\Delta I_{OUT3}$ of the tripler TP3 can be expressed by the following equation (11) as $$\Delta I_{OUT3} = \alpha_{Fp}(\Delta I_3)\tanh\left(\frac{V_1}{2V_T}\right) \quad (11)$$

where $\alpha_{Fp}$ is the current gain factor of a pnp bipolar transistor.

In the equation (11), the differential output current $\Delta I_3$ of the multiplier MP3 is dominated by a current component of the product of the second and third input voltages $V_2$ and $V_3$. Also, tanhx can be approximated in, small signal applications as $\tanh x = x-(1/3)x^3 \ldots \approx X(|x|<<1)$.

As a result, the differential output current $\Delta I_{OUT3}$ of the tripler TP3 is dominated by a current component of the product of the first, second and third input voltages $V_1$, $V_2$ and $V_3$. This means that the schematic circuit diagram in FIG. 6 shows another general tripler circuit.

Figure 1:
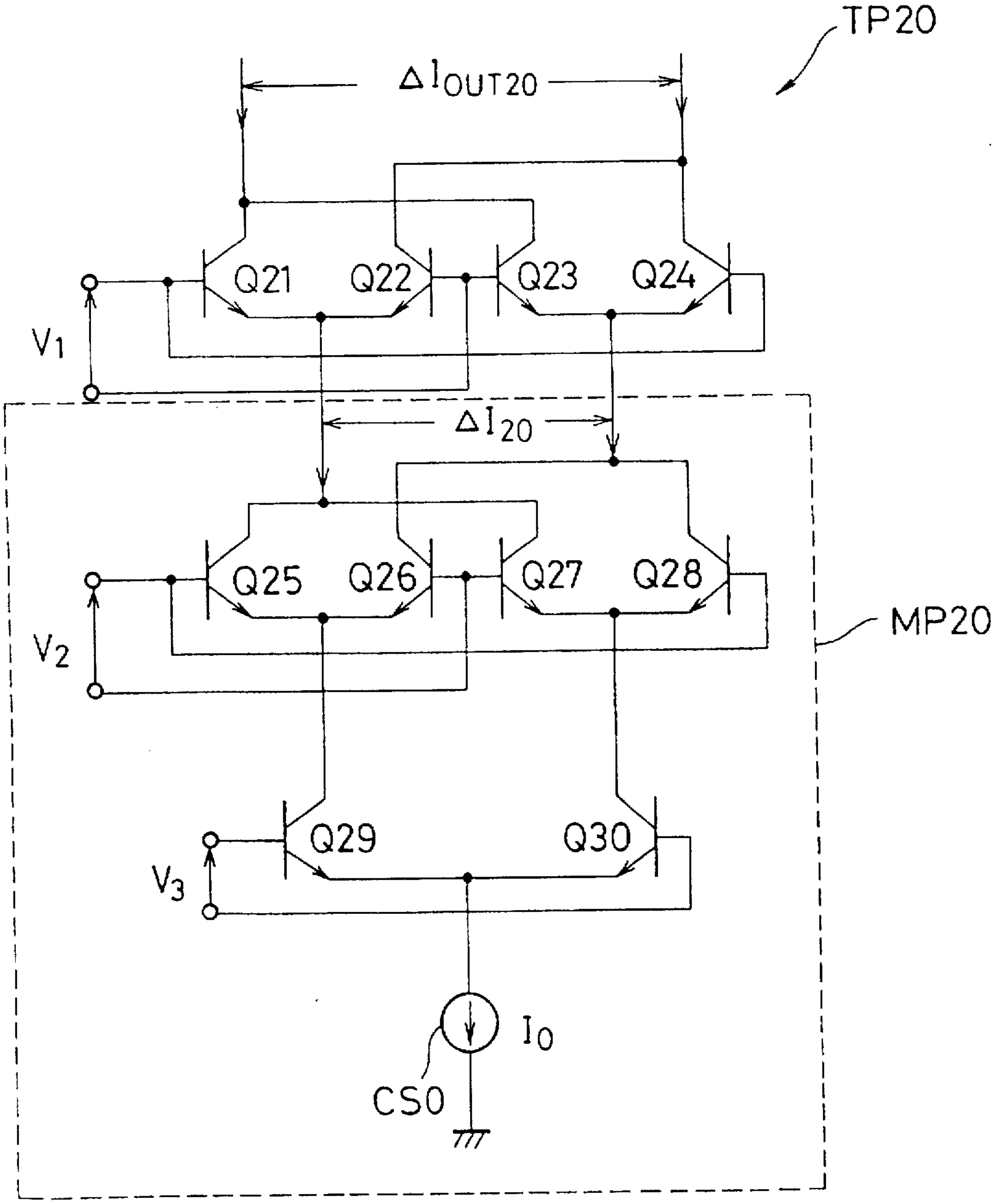
FIG.1 (PRIOR ART)
FIG. 1 is a circuit diagram showing a conventional tripler.

FIG. 7 shows a concrete circuit of the multiplier MP3 in FIG. 6, which is the same in configuration as the conventional Gilbert cell multiplier MP20 shown in FIG. 1.

Therefore, the differential output current $\Delta I_3$ of the multiplier MP3 is expressed as the above equation (2).

As a result, the differential output current $\Delta I_{OUT2}$ of the tripler TP3 can be expressed by the following equation (12) as $$\Delta I_{OUT3} = \alpha_{Fp}\alpha_{Fn}^2 I_0 \tanh\left(\frac{V_1}{2V_T}\right)\tanh\left(\frac{V_2}{2V_T}\right)\tanh\left(\frac{V_3}{2V_T}\right) \quad (12)$$

Here, since tanhx can be approximated in small signal applications as $\tanh x = x-(1/3)x^3 \ldots \approx X(|x|<<1)$, $\Delta I_{OUT3}$ can be rewritten to the following equation (13) as $$\Delta I_{OUT3} \approx \frac{\alpha_{Fp}\alpha_{Fn}^2 I_0}{(2V_T)^3} V_1V_2V_3 \quad (13)$$

$$(|V_1| < 2V_T, |V_2| < 2V_T, |V_3| < 2V_T)$$

It is seen from the equation (13) that the differential output current $\Delta I_{OUT3}$ of the tripler TP31 shown in FIG. 7 is approximately proportional to the product or multiplication result of the three input voltage $V_1$, $V_2$ and $V_3$.

In the third embodiment, the multiplier MP3 is composed of the two stages of the vertically-arranged bipolar transistors Q5' to Q10' forming the Gilbert cell multiplier MP3, and the stage of the bipolar transistors Q1' to Q4' is not stacked vertically to the Gilbert cell multiplier MP3, so that the tripler TP3 has only two stacked stages of the bipolar transistors as a whole.

Accordingly, the tripler TP3 can operate at a power source voltage of about 2.8 V, which is satisfied with the demand for the power source voltage of 3 V or less.

Fourth Embodiment

Figure 8:
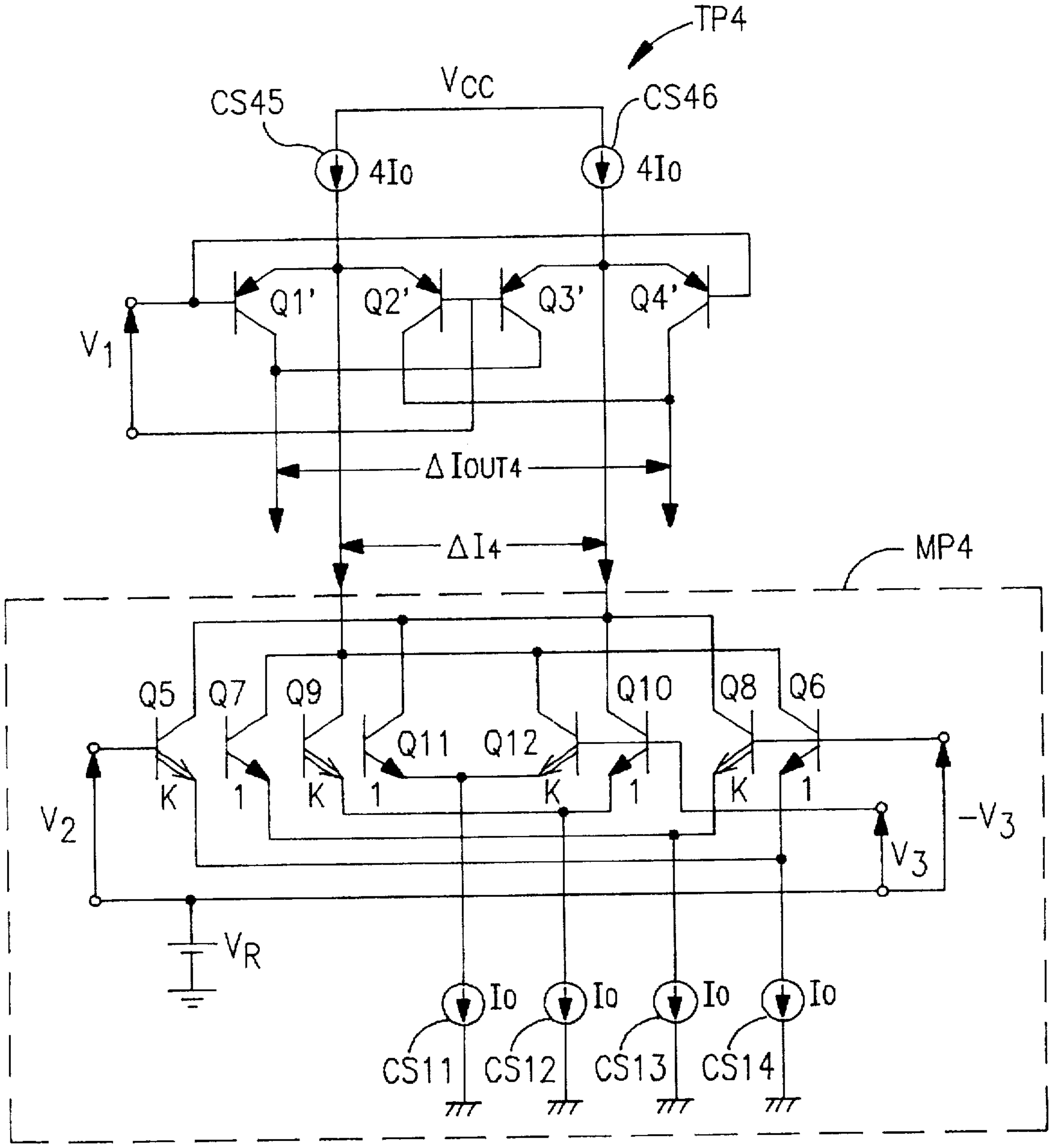
FIG. 8 is a circuit diagram of a tripler according to a fourth embodiment of the invention.

FIG. 8 shows a tripler TP4 according to a fourth embodiment of the invention.

Figure 2:
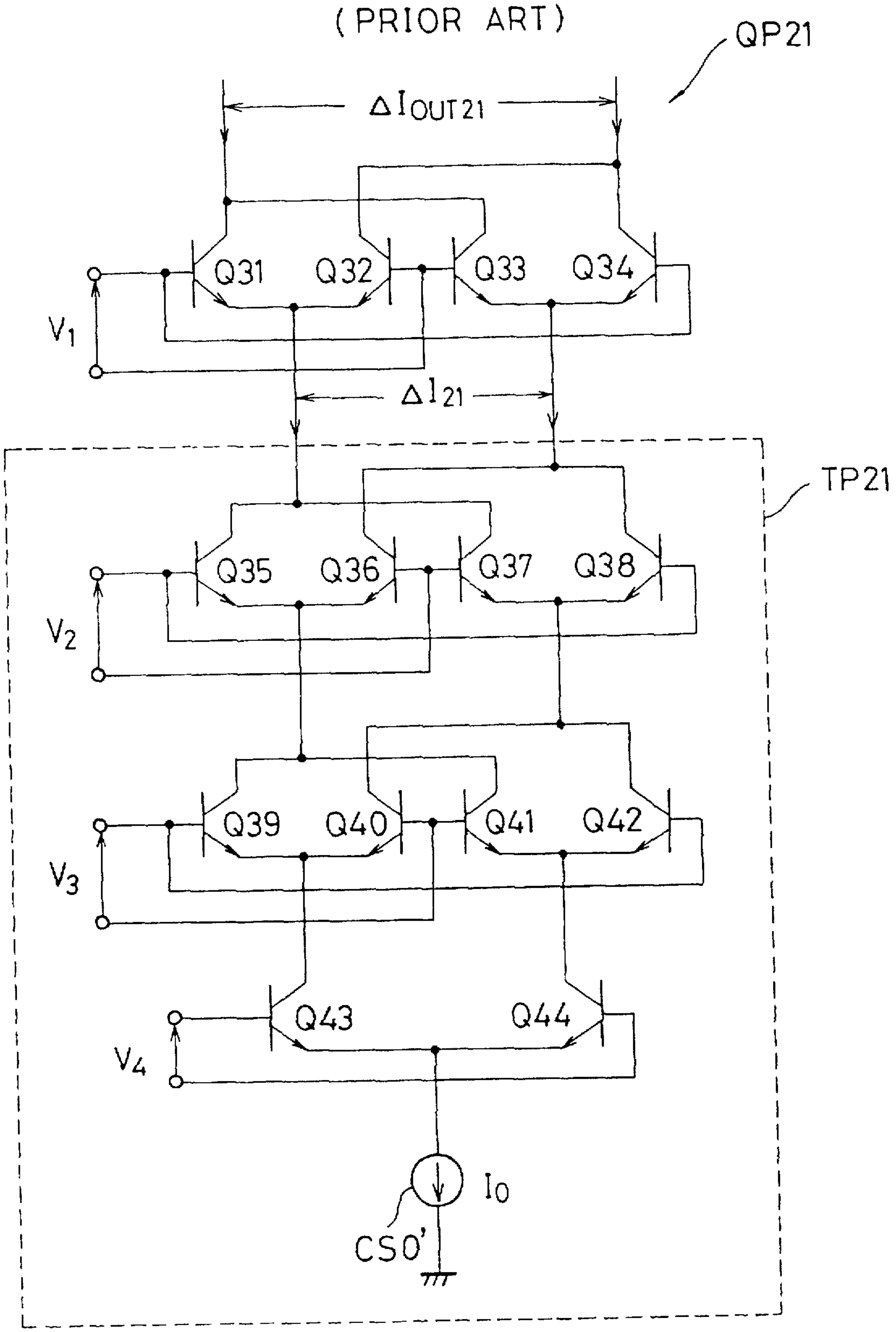
FIG.2 (PRIOR ART)
FIG. 2 is a circuit diagram showing a conventional quadrupler.

As shown in FIG. 8, the tripler TP4 has the same first and second emitter-coupled pairs of the transistors Q1', Q2', Q3' and Q4' as those of the third embodiment in FIGS. 6 and 7. A multiplier MP4 of the tripler TP4 is the same in configuration as the multiplier MP1 of the first embodiment shown in FIG. 2.

Therefore, a differential output current $\Delta I_{OUT4}$ of the tripler TP4 can be expressed by the following equation (14) as $$\Delta I_{OUT4} = 2\alpha_{Fp}\alpha_{Fn}I_0\tanh\left(\frac{V_1}{2V_T}\right)\{K-(1/K)\}\times \quad (14)$$

$$\left\{\frac{1}{2\cosh A + K + (1/K)} - \frac{1}{2\cosh B + K + (1/K)}\right\}$$

$$\left(A = \frac{(V_2+V_3)}{V_t}, B = \frac{(V_2-V_3)}{V_T}\right)$$

Here, since tanhx can be approximated in small signal applications as $\tanh x = x-(1/3)x^3 \ldots \approx X(|x|<<1)$, $\Delta I_{OUT4}$ can be rewritten to the following equation (14) as $$\Delta I_{OUT4} \approx \frac{-4\alpha_{Fn}\alpha_{Fp}I_0\{K-(1/K)\}}{\{K+(1/K)+2\}^2}\times\left(\frac{V_1V_2V_3}{V_T^3}\right) \quad (14)$$

$$(A<1, B<1)$$

In the equation (13), when $K+(1/K)=10$ is established, that is, $K=9.8989$, the maximum input voltage range can be obtained.

Similar to the first embodiment, the multiplier MP4 is composed of the single stage of the bipolar transistors Q5 to Q12 arranged horizontally along one line, and the stage of the bipolar transistors Q1' to Q4' is not stacked vertically on the multiplier MP4, so that the tripler TP4 is composed of only one stage of the bipolar transistors as a whole.

Accordingly, the tripler TP4 also can operate at a power source voltage of about 2.8 V, which is satisfied with the demand for the power source voltage of 3 V or less.

Fifth Embodiment

Figure 9:
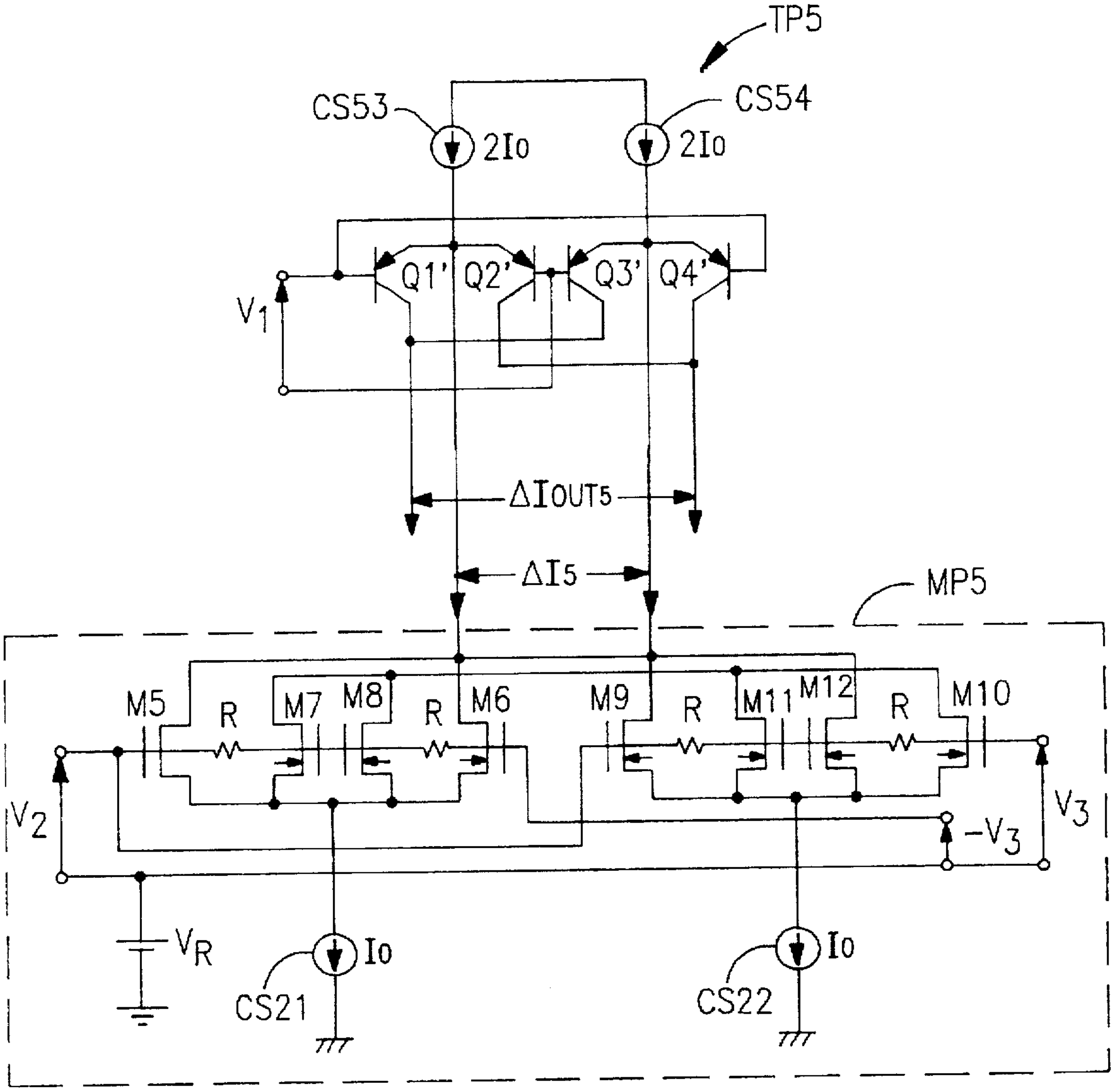
FIG. 9 is a circuit diagram of a tripler according to a fifth embodiment of the invention.

FIG. 9 shows a tripler TP5 according to a fifth embodiment of the invention.

As shown in FIG. 9, the tripler TP5 has the same first and second emitter-coupled pairs of the transistors Q1', Q2', Q3' and Q4' as those of the third embodiment in FIGS. 6 and 7 excepting that the current values of constant current sources CS53 and CS54 are $2I_0$. A multiplier MP5 of the tripler TP5 is the same in configuration as the multiplier MP2 of the second embodiment shown in FIG. 5.

Therefore, if the ranges of the second and third input voltages $V_2$ and $V_3$ are limited, a differential output current $\Delta I_{OUT5}$ of the tripler TP5 can be expressed by the following equation (15) as $$\Delta I_{OUT5} = 2\alpha_{FP}\beta\tanh\left(\frac{V_1}{2V_T}\right)V_2V_3$$

$$\left(|V_2 \pm V_3| \leqq \sqrt{\frac{2_0}{3\beta}}\right) \quad (15)$$

Similar to the second embodiment, the multiplier MP5 is composed of the single stage of the MOS transistors M5 to M12 arranged horizontally along one line, and the stage of the bipolar transistors Q1' to Q4' is not stacked on the multiplier MP5.

Accordingly, the tripler TP5 also can operate at a power source voltage of about 2.8 V, which is satisfied with the demand for the power source voltage of 3 V or less.

Any other multipliers with differential output currents may be used in the third to fifth embodiments. For example, multipliers disclosed in the Japanese Non-examined Patent Publication No. 3-210683 (1991), 4-34673 (1992), 4-309190 (1992), the Japanese Patent Application No. 5-176025 (1993) and 5-19358 (1993). The Japanese Patent Application No. 5-19358 is corresponding to the U.S. patent application Ser. No. 08/179,955.

Sixth Embodiment

Figure 10:
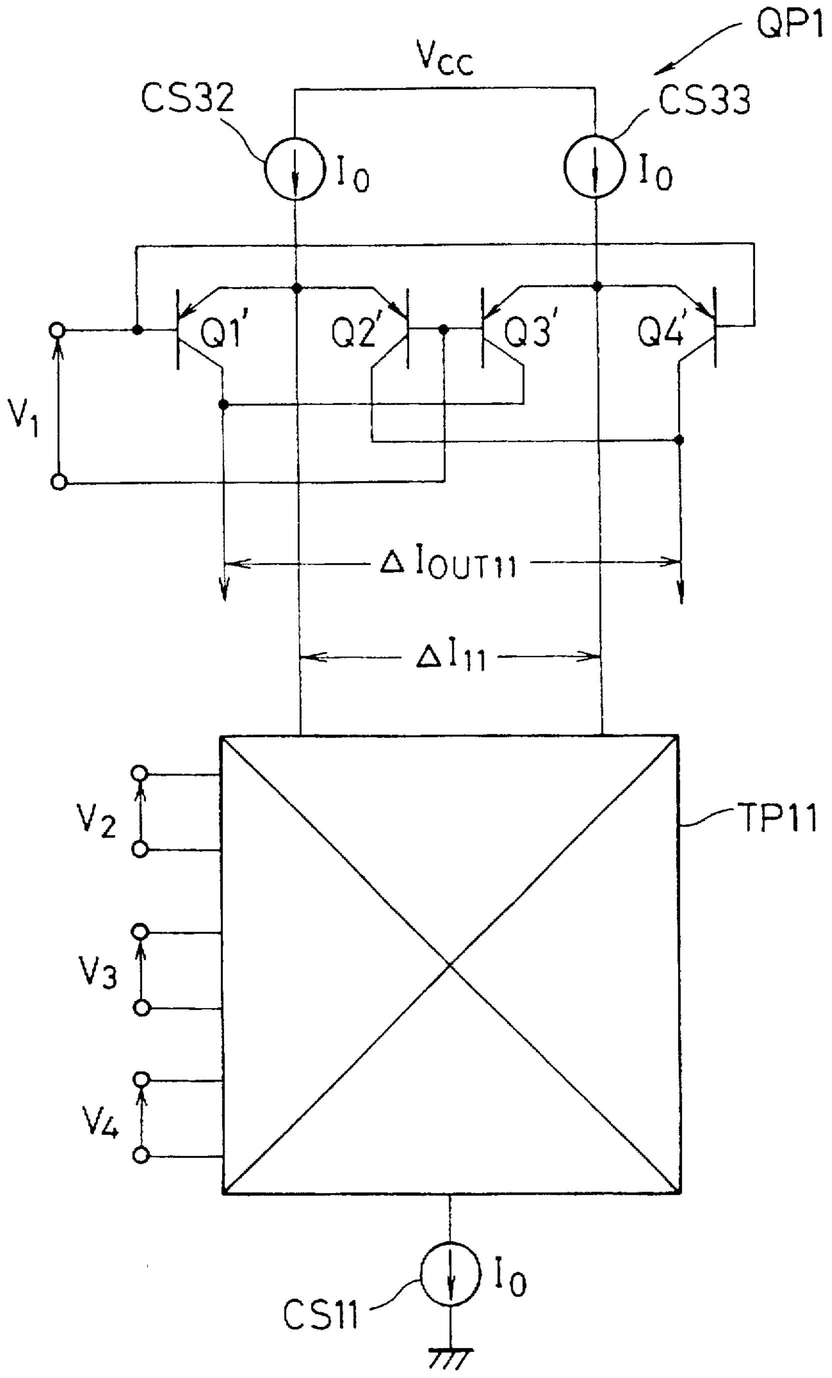
FIG. 10 is a schematic circuit diagram of a quadrupler according to a sixth embodiment of the invention.
Figure 11:
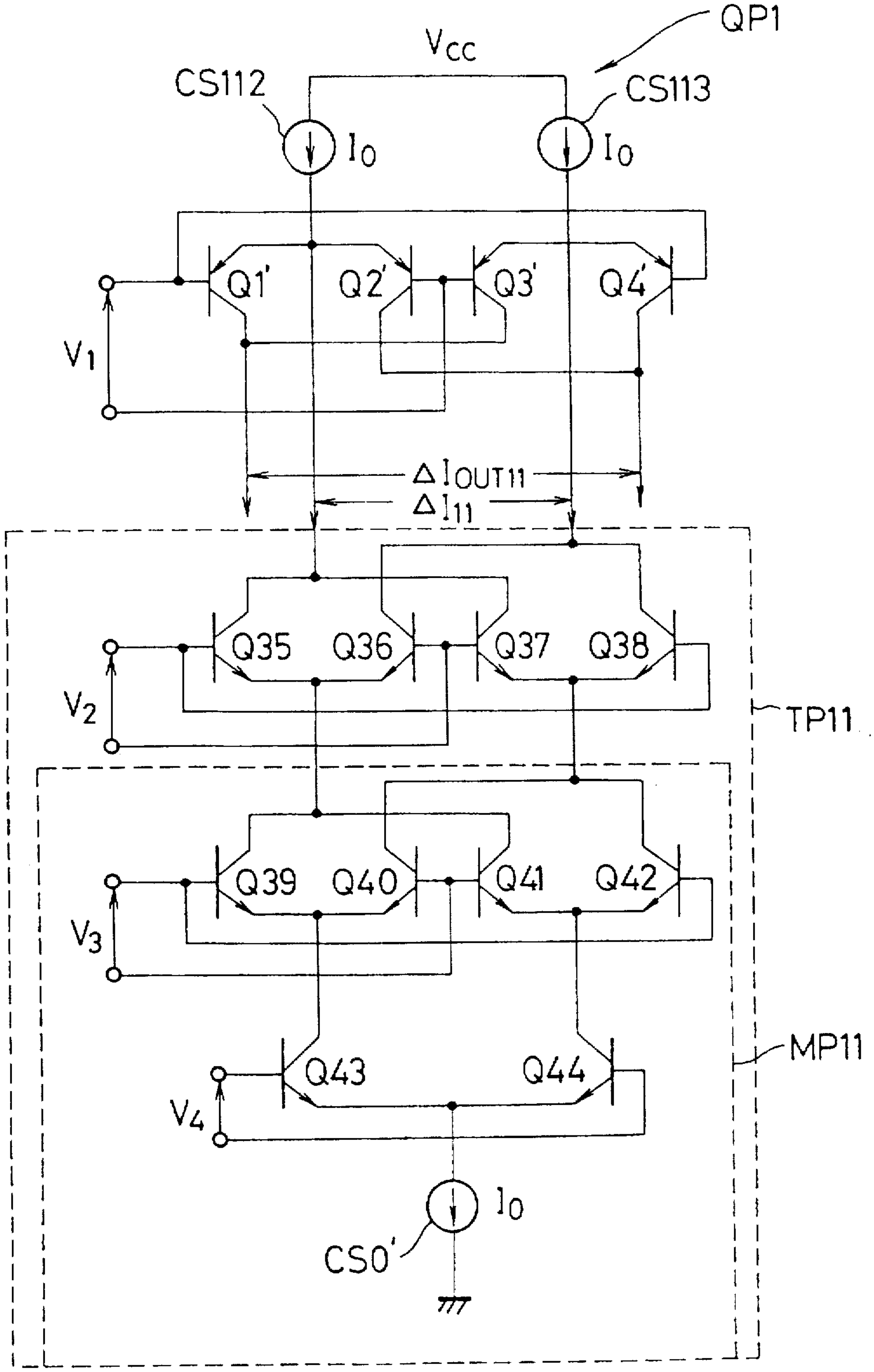
FIG. 11 is a circuit diagram of the tripler according to the sixth embodiment shown in FIG. 10.

FIGS. 10 and 11 show a quadrupler QP1 according to a sixth embodiment of the present invention.

As shown in FIG. 10, the quadrupler QP1 is composed of the first pair of pnp bipolar transistors Q1' and Q2' whose emitters are coupled together, a second pair of pnp bipolar transistors Q3' and Q4' whose emitters are coupled together, and a tripler TP11. The stage of the transistors Q1', Q2', Q3' and Q4' is the same in configuration as that of the third embodiment shown in FIG. 6.

Bases of the transistors Q1' and Q4' are coupled together to form one of the first pair of input ends. Bases of the transistors Q2' and Q3' are coupled together to form the other of the first pair of input ends. A first input voltage $V_1$ is applied across the first pair of input ends.

Collectors of the transistors Q1' and Q3' are coupled together to form one of the first pair of output ends for the quadrupler QP11. Collectors of the transistors Q2' and Q4' are coupled together to form the other of the first pair of output ends.

A differential output current $\Delta I_{OUT11}$ of the quadrupler QP1 is derived from the first pair of output ends The constant current source (current: $I_0$) CS32 is connected between the emitters coupled of the transistors Q1' and Q2' and the power source (voltage: $V_{CC}$). The constant current source (current: $I_0$) CS33 is connected between the emitters coupled of the transistors Q3' and Q4' and a power source (voltage: $V_{CC}$).

The tripler TP11 has a second pair of input ends to be applied with a second input voltage $V_2$, a third pair of input ends to be applied with a third input voltage $V_3$, and a second pair of output ends from which a differential output current $\Delta I_{11}$ of the tripler TP11 is derived. The current $\Delta I_{11}$ shows the multiplication result of the second, third and fourth input voltages $V_2$, $V_3$ and $V_4$.

One of the second pair of output ends of the tripler TP11 is connected to the emitters coupled of the transistors Q1' and Q2' and the other thereof is connected to the emitters coupled of the transistors Q3' and Q4'. The first and second emitter-coupled pairs are driven by the differential output current $\Delta I_{11}$ of the tripler TP11.

The differential output current $\Delta I_{OUT11}$ is a quadrupler output and shows the multiplication result of the first, second, third and fourth input voltages $V_1$, $V_2$, $V_3$ and $V_4$.

The tripler TP11 is driven by a constant current source CS111 (current: $I_0$).

With the quadruplex QP1 of the sixth embodiment, similar to the third embodiment, the first emitter-coupled pair of the transistors Q1' and Q2' composes a differential pair, and the first input voltage $V_1$ is applied across the bases of the transistors Q1' and Q2'. The second emitter-coupled pair of the transistors Q3' and Q4' composes another differential pair, and the first input voltage $V_1$ is applied across the bases of the transistors Q3' and Q4' in an opposite phase.

In addition, these two differential pairs are driven by the differential output current $\Delta I_{11}$ of the tripler TP11.

Therefore, the differential output current $\Delta I_{OUT11}$ as the quadrupler output is proportional to the product of the first input voltage $V_1$ and the differential output current $\Delta I_{11}$ of the tripler TP11.

Here, the differential output current of the tripler TP11 is proportional to the product of the second, third and fourth input voltages $V_2$, $V_3$ and $V_4$.

As a result, the differential output current $\Delta I_{OUT11}$ is proportional to the product of the first, second, third and fourth input voltages $V_1$, $V_2$, $V_3$ and $V_4$, which means that the current $\Delta I_{OUT11}$ shows the multiplication result of the first, second, third and fourth input voltages $V_1$, $V_2$, $V_3$ and $V_4$.

In the sixth embodiment, the first and second differential pairs of the transistors Q1', Q2', Q3' and Q4' are arranged between the pair of output ends of the tripler TP11 and the current sources CS32 and CS 33. Then, assuming that the differential output current $\Delta I_{11}$ is equal in value to the driving current $I_0$ of the current source CS31, the differential output current $\Delta I_{OUT11}$ of the quadrupler QP1 can be expressed by the following equation (10') similar to the equation (10) as $$\Delta I_{OUT11} = \alpha_{Fp}(\Delta I_{11})\tanh\left(\frac{V_1}{2V_T}\right) \tag{10'}$$

The differential output current $\Delta I_{11}$ of the tripler MP11 is dominated by a current component of the product of the second, third and fourth input voltages $V_2$, $V_3$ and $V_4$. Also, tanhx can be approximated in small signal applications as $\tanh x = x-(1/3)x^3 \ldots \approx X(|x|<<1)$. As a result, the differential output current $\Delta I_{OUT11}$ of the quadrupler QP1 is dominated by a current component of the product of the first, second, third and fourth input voltages $V_1$, $V_2$, $V_3$ and $V_4$. This means that the schematic circuit diagram in FIG. 10 shows a general quadrupler circuit.

FIG. 11 shows a concrete circuit of the tripler TP11 in FIG. 10.

As shown in FIG. 11, the tripler TP11 is composed of a multiplier MP11 and two emitter-coupled pairs of the transistors Q35, Q36, Q37 and Q38. The tripler TP11 is the same in configuration as the conventional tripler TP 21 shown in FIG. 2.

The differential output current $\Delta I_{11}$ of the tripler TP11 can be expressed by the following equation (16) as $$\Delta I_{11} = \alpha_{Fn}^3 I_0 \tanh\left(\frac{V_2}{2V_T}\right)\tanh\left(\frac{V_3}{2V_T}\right)\tanh\left(\frac{V_4}{2V_T}\right) \tag{16}$$

Therefore, the differential output current $\Delta I_{OUT11}$ of the quadrupler QP1 can be expressed by the following equation (17) as $$\Delta I_{OUT11} = \alpha_{Fp}\alpha_{Fn}^3 I_0 \tanh\left(\frac{V_1}{2V_T}\right)\tanh\left(\frac{V_2}{2V_T}\right)\tanh\left(\frac{V_3}{2V_T}\right)\tanh\left(\frac{V_4}{2V_T}\right) \tag{17}$$

Here, since tanhx can be approximated in small signal applications as $\tanh x = x-(1/3)x^3 \ldots \approx X(|x|<<1)$, $\Delta I_{OUT11}$ can be rewritten to the following equation (18) as $$\Delta I_{OUT11} \approx \frac{\alpha_{Fp}\alpha_{Fn}^3 I_0}{(2V_T)^4}(V_1V_2V_3V_4) \tag{18}$$

$$(|V_1| < 2V_T, |V_2| < 2V_T, |V_3| < 2V_T, |V_4| < 2V_T)$$

It is seen from the equation (18) that the differential output current $\Delta I_{OUT11}$ of the quadrupler QP1 shown in FIG. 11 is approximately proportional to the product or multiplication result of the four input voltage $V_1$, $V_2$, $V_3$ and $V_4$.

In the sixth embodiment, the quadrupler QP1 contains the tripler TP11 of the bipolar transistors Q35 to Q44 arranged vertically, and the stage of the bipolar transistors Q1' to Q4' is not stacked vertically on the tripler TP11, so that the quadrupler QP1 of the sixth embodiment is composed of only two stages of the bipolar transistors as a whole.

Accordingly, the quadrupler QP1 can operate at a power source voltage of about 2.8 V, which is satisfied with the demand for the power source voltage of 3 V or less.

Seventh Embodiment

Figure 12:
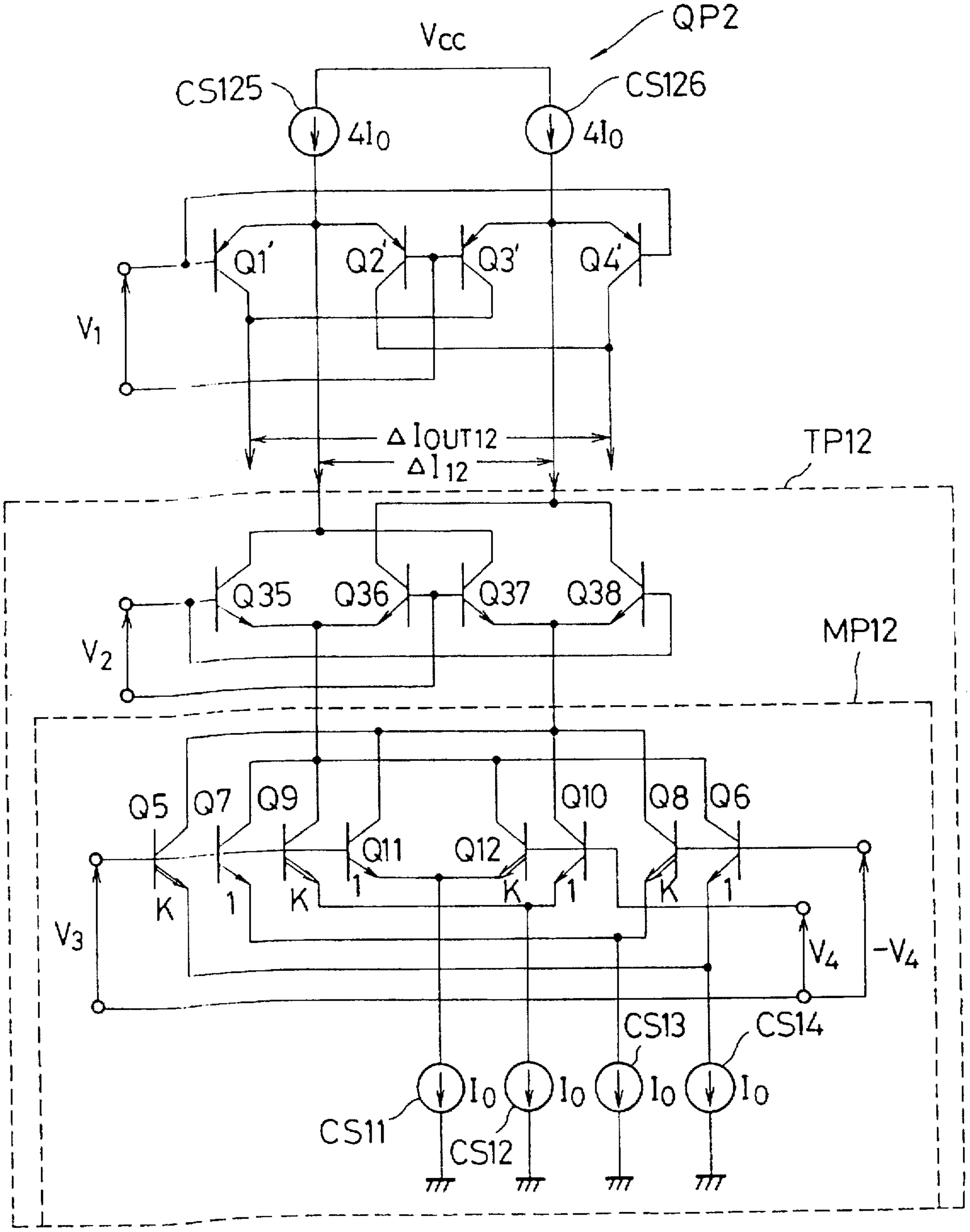
FIG. 12 is a circuit diagram of a quadrupler according to a seventh embodiment of the invention.

FIG. 12 shows a quadrupler QP2 according to a seventh embodiment of the invention.

As shown in FIG. 12, the quadrupler QP2 has the same first and second emitter-coupled pairs of the transistors Q1', Q2', Q3' and Q4' as those of the third embodiment in FIG. 6. A tripler TP12 shown in FIG. 12 is disclosed in the Japanese Patent Application No. 4-72629 (the Japanese Non-Examined Patent Publication No. 5-94552) whose corresponding U.S. patent application Ser. No. 08/179,955.

As shown in FIG. 12, the tripler TP12 is composed of the emitter-coupled npn bipolar transistors Q35, Q36, Q37 and Q38 shown in FIG. 11 and the multiplier MP12 which is the same in configuration as the multiplier MP4 shown in FIG. 8.

The first and second emitter-coupled pairs of the transistors Q1', Q2', Q3 ' and Q4' are driven by a differential output current $\Delta I_{12}$ of the tripler TP12.

The current values of constant current sources CS53 and CS54 are $4I_0$.

A differential output current $\Delta I_{OUT12}$ of the quadrupler QP2 is derived from the collectors coupled of the transistors Q1' and Q3' and those coupled of the transistors Q2' and Q4'.

The differential output current $\Delta I_{OUT12}$ of the quadrupler QP2 can be expressed by the following equation (19) as $$\Delta I_{OUT12} = 2\alpha_{Fp}\alpha_{Fn}^2 I_0 \tanh\left(\frac{V_1}{2V_T}\right)\tanh\left(\frac{V_2}{2V_T}\right)\{K-(1/K)\}\times \left\{\frac{1}{2\cosh\{(V_3+V_4)/V_T\}+K+(1/K)} - \frac{1}{2\cosh\{(V_3-V_4)/V_T\}+K+(1/K)}\right\} \tag{19}$$

$$(|V_1| < 2V_T, |V_2| < 2V_T, |V_3| < 2V_T, |V_4| < 2V_T)$$

The equation (19) can be approximated as $$\Delta I_{OUT12} \approx \frac{-2\alpha_{Fn}\alpha_{Fp} I_0\{K-(1/K)\}}{\{K+(1/K)+2\}^2} \times \left(\frac{V_1V_2V_3V_4}{V_T^4}\right) \tag{20}$$

$$(A < 1, B < 1)$$

It is seen from the equation (20) that the differential output current $\Delta I_{OUT12}$ of the quadrupler QP1 shown in FIG. 12 is approximately proportional to the product or multiplication result of the four input voltage $V_1$, $V_2$, $V_3$ and $V_4$.

In the seventh embodiment, the tripler TP12 is composed of a stage of the emitter-coupled pairs of the transistors Q35, Q36, Q37 and Q38 and a stage of the multiplier MP12, both of which are vertically-arranged. Also, the stage of the bipolar transistors Q1' to Q4' is not stacked vertically to the stage of the emitter-coupled pairs. Therefore, the tripler TP3 has only two stacked stages of the bipolar transistors as a whole.

Accordingly, the quadrupler QP2 can operate at a power source voltage of about 2.8 V, which is satisfied with the demand for the power source voltage of 3 V or less.

Eighth Embodiment

Figure 13:
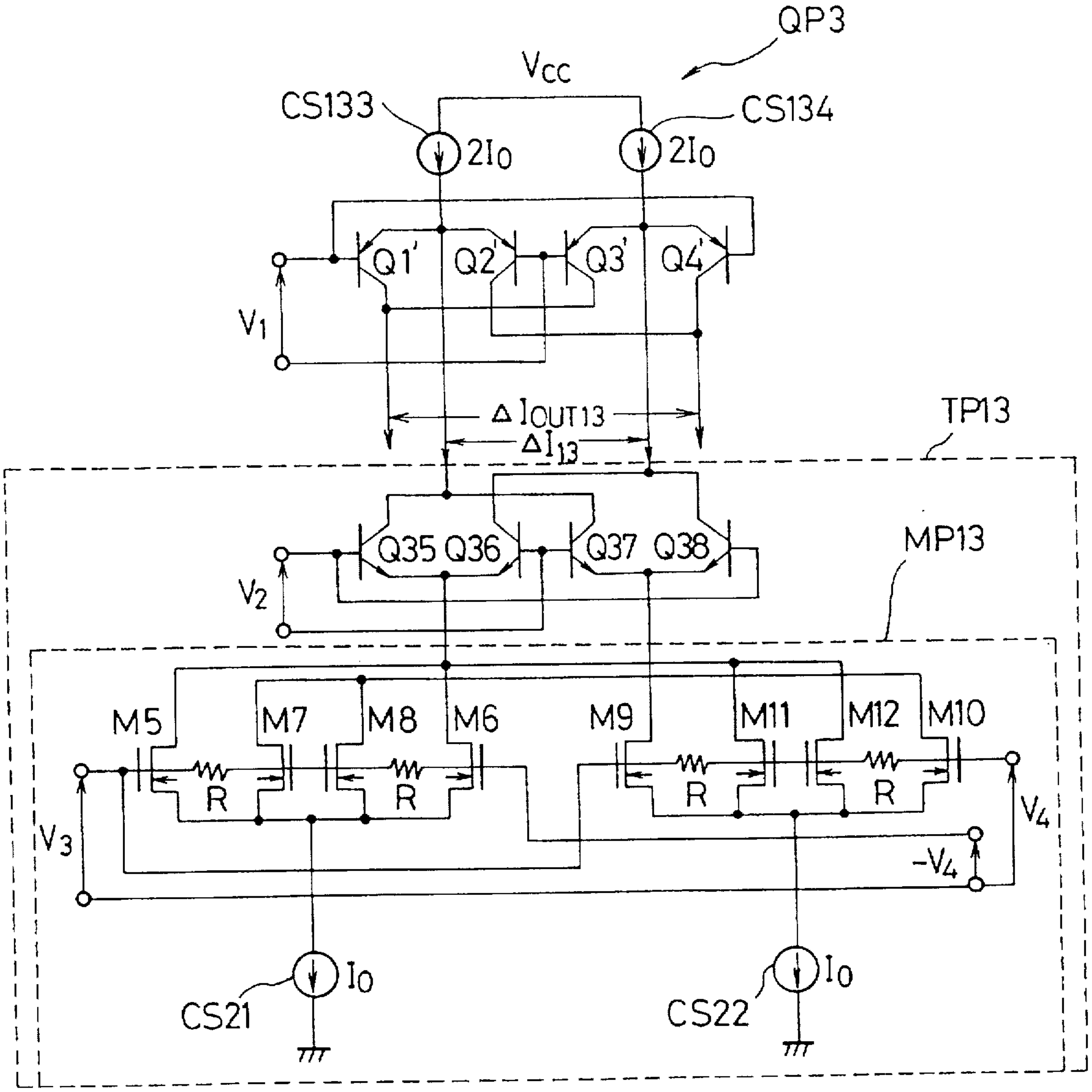
FIG. 13 is a circuit diagram of a quadrupler according to an eighth embodiment.

FIG. 13 shows a quadrupler QP3 according to a eighth embodiment of the invention.

As shown in FIG. 13, the quadrupler QP3 has the same first and second emitter-coupled pairs of the transistors Q1', Q2', Q3' and Q4' as those of the third embodiment in FIG. 6 excepting that the current values of constant current sources CS133 and CS134 are $2I_0$. A tripler TP13 shown in FIG. 13 is disclosed in the Japanese Patent Application No. 5-176025 whose corresponding U.S. patent application Ser. No. 08/120,462.

The tripler TP13 is composed of the emitter-coupled npn bipolar transistors Q35, Q36, Q37 and Q38 shown in FIG. 11 and the multiplier MP13 which is the same in configuration as the multiplier MP5 shown in FIG. 9.

The first and second emitter-coupled pairs of the transistors Q1', Q2', Q3' and Q4' are driven by a differential output current $\Delta I_{13}$ of the tripler TP13.

A differential output current $\Delta I_{OUT13}$ of the quadrupler QP3 is derived from the collectors coupled of the transistors Q1' and Q3' and the collectors coupled of the transistors Q2' and Q4'.

The differential output current $\Delta I_{OUT13}$ of the quadrupler QP3 can be expressed by the following equation (21) as $$\Delta I_{OUT13} = 2\alpha_{Fn}\alpha_{Fn}\beta \tanh\left(\frac{V_1}{2V_T}\right)\tanh\left(\frac{V_2}{2V_T}\right)V_3V_4 \tag{21}$$

$$\left(|V_3 \pm V_4| \leqq \sqrt{\left(\frac{2I_0}{3\beta}\right)}\right)$$

The equation (21) is approximated to the following equation (22) as $$\Delta I_{OUT13} \approx \frac{1}{2}\alpha_{Fn}\alpha_{Fp}\beta\left(\frac{1}{V_T}\right)^2 V_1V_2V_3V_4 \tag{22}$$

$$\left(|V_3 \pm V_4| \leqq \sqrt{\left(\frac{2I_0}{3\beta}\right)}\right)$$

It is seen from the equation (22) that the differential output current $\Delta I_{OUT13}$ of the quadrupler QP3 shown in FIG. 13 is approximately proportional to the product or multiplication result of the four input voltage $V_1$, $V_2$, $V_3$ and $V_4$.

In the eighth embodiment, the tripler TP13 is composed of a stage of the emitter-coupled pairs of the transistors Q35, Q36, Q37 and Q38 and a stage of the multiplier MP13, both of which are vertically-arranged. Also, the stage of the bipolar transistors Q1' to Q4' is not stacked vertically to the stage of the emitter-coupled pairs. Therefore, the quadrupler QP3 has only two stacked stages of the bipolar and MOS transistors as a whole.

Accordingly, the quadrupler QP3 can operate at a power source voltage of about 2.8 V, which is satisfied with the demand for the power source voltage of 3 V or less.

Any other multipliers with differential output currents may be used in the sixth to eighth embodiments. For example, multipliers disclosed in the Japanese Non-Examined Patent Publication No. 3-210683 (1991), 4-34673 (1992), 4-309190 (1992), the Japanese Patent Application No. 5-176025 (1993) and 5-19358 (1993). The Japanese Patent Application No. 5-19358 is corresponding to the U.S. patent application Ser. No. 08/179,955.

Ninth Embodiment

Figure 14:
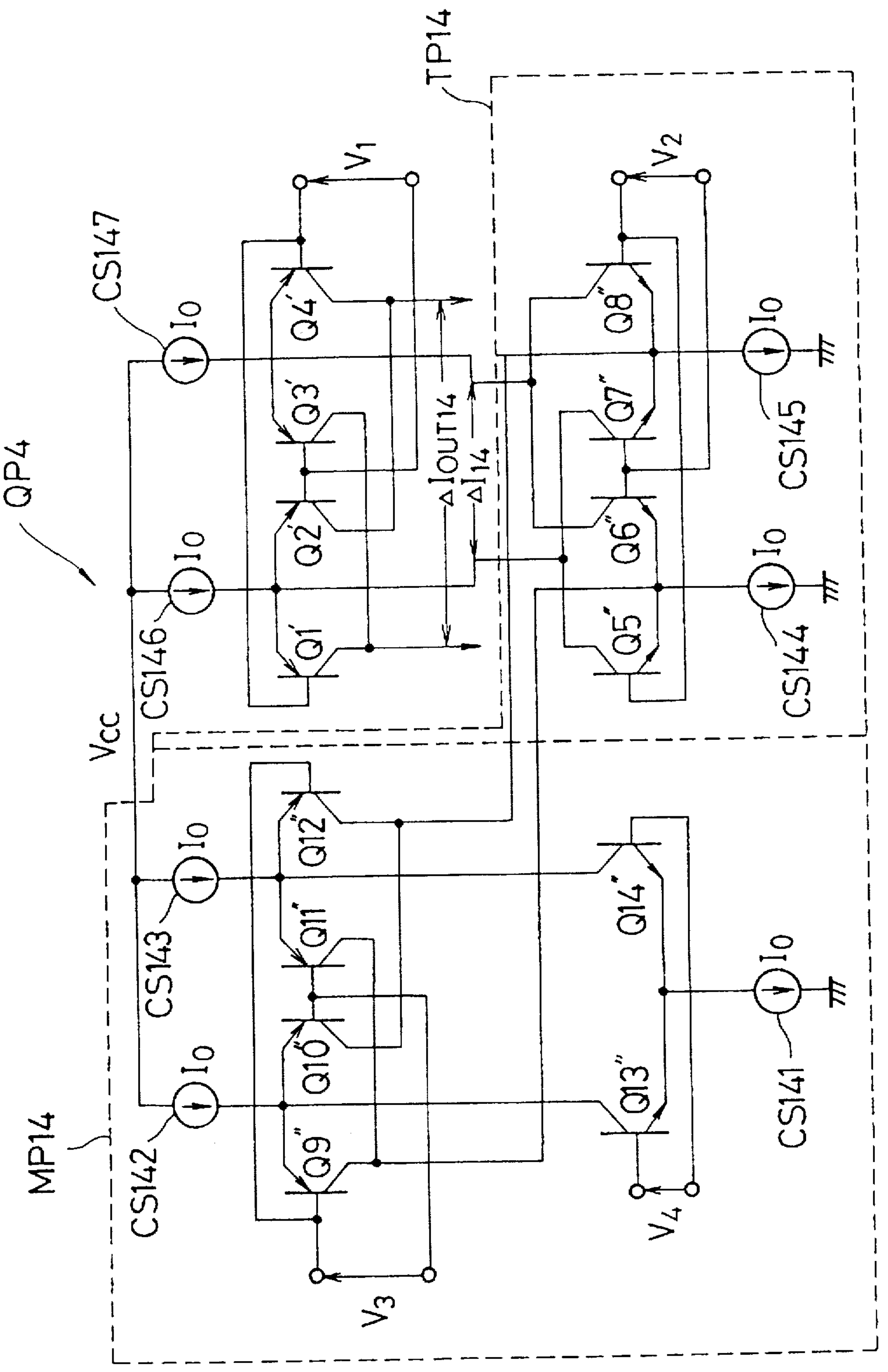
FIG. 14 is a circuit diagram of a quadrupler according to a ninth embodiment shown in FIG. 6.

FIG. 14 shows a quadrupler QP4 according to a ninth embodiment of the invention.

As shown in FIG. 14, the quadrupler QP4 has the same first and second emitter-coupled pairs of the transistors Q1', Q2', Q3' and Q4' as those of the third embodiment in FIG. 6, which are driven by constant current sources CS146 and CS147 (current: $I_0$).

A tripler TP14 is composed of emitter-coupled pairs of npn bipolar transistors Q5", Q6", Q7" and Q8" and a multiplier MP14. The emitter-coupled pair of the transistors Q5", Q6", Q7" and Q8" are substantially the same as the emitter-coupled pairs of the transistors Q35, Q36, Q37 and Q38 shown in FIG. 12 excepting that constant current sources CS144 and CS145 (current: $I_0$) are provided to drive the pairs, respectively.

The first and second emitter-coupled pairs of the transistors Q1', Q2', Q3' and Q4' are driven by a differential output current $\Delta I_{14}$ of the tripler TP14.

A differential output current $\Delta I_{OUT14}$ of the quadrupler QP4 is derived from the collectors coupled of the transistors Q1' and Q3' and the collectors coupled of the transistors Q2' and Q4'.

The multiplier MP14 contains third and fourth emitter-coupled pairs of pnp bipolar transistors Q9' and Q10', and Q11' and Q12'; both of the pairs are driven by constant current sources CS142 and CS143 (current: $I_0$), respectively. The current source CS142 is connected to the emitters coupled of the transistors Q9" and Q10" and the current source CS142 is connected to the emitters coupled of the transistors Q11" and Q12".

The third input voltage $V_3$ is applied across coupled bases of the transistors Q9" and Q12" and coupled bases of the transistors Q10" and Q11".

Collectors of the transistors Q9" and Q11" are coupled together to, be connected to the emitters coupled of the transistors Q5" and Q6". Collectors of the transistors Q10" and Q12" are coupled together to be connected to the emitters coupled of the transistors Q7" and Q8". Thus, the emitter-coupled pairs of the transistors Q5" to Q8" are driven by the output of the multiplier MP14.

The multiplier MP14 further contains an emitter-coupled pair of npn bipolar transistors Q13" and Q14". The emitters coupled thereof are connected to a constant current source CS141 (current: $I_0$). A collector of the transistor Q13" is connected to the emitters coupled of the transistors Q9" and Q10". A collector of the transistor Q14" is connected to the emitters coupled of the transistors Q9" and Q10".

The fourth input voltage $V_4$ is applied across bases of the transistors Q13" and Q14".

A power source (voltage: $V_{CC}$) is connected to the constant current sources CS142, CS143, CS146 and CS147. The constant current sources CS141, CS144 and CS145 are grounded.

The differential output current $\Delta I_{OUT14}$ is a quadrupler output and shows the multiplication result of the first, second, third and fourth input voltages $V_1$, $V_2$, $V_3$ and $V_4$.

The differential output current $\Delta I_{14}$ of the tripler TP14 can be expressed by the following equation (23) as $$\Delta I_{14} = \alpha_{Fp}\alpha_{Fn}^2 I_0 \tanh\left(\frac{V_2}{2V_T}\right)\tanh\left(\frac{V_3}{2V_T}\right)\tanh\left(\frac{V_4}{2V_T}\right) \qquad (23)$$

Therefore, the differential output current $\Delta I_{OUT14}$ of the quadrupler QP4 can be expressed by the following equation (24) as $$\Delta I_{OUT14} = \alpha_{Fp}^2\alpha_{Fn}^2 I_0 \tanh\left(\frac{V_1}{2V_T}\right)\tanh\left(\frac{V_2}{2V_T}\right)\tanh\left(\frac{V_3}{2V_T}\right)\tanh\left(\frac{V_4}{2V_T}\right) \qquad (24)$$

It is seen from the equation (24), that the current $\Delta I_{OUT14}$ is approximately proportional to the product or multiplication result of the four input voltage $V_1$, $V_2$, $V_3$ and $V_4$.

Here, since tanhx can be approximated in small signal applications as $\tanh x = x-(1/3)x^3 \ldots \approx X(|x|<<1)$, $\Delta I_{OUT14}$ can be rewritten to the following equation (25) as $$\Delta I_{OUT14} \approx \frac{\alpha_{Fp}^2\alpha_{Fn}^2 I_0}{(2V_T)^4}(V_1V_2V_3V_4) \qquad (25)$$

$$(|V_1| < 2V_T, |V_2| < 2V_T, |V_3| < 2V_T, |V_4| < 2V_T)$$

In the tripler TP14, since no stage is vertically stacked on the stage of the emitter-coupled pairs of the transistors Q13" and Q14", the quadrupler QP4 can operate at a power source voltage of about 2 V, which is satisfied with the demand for the power source voltage of 3 V or less.

Tenth Embodiment

Figure 15:
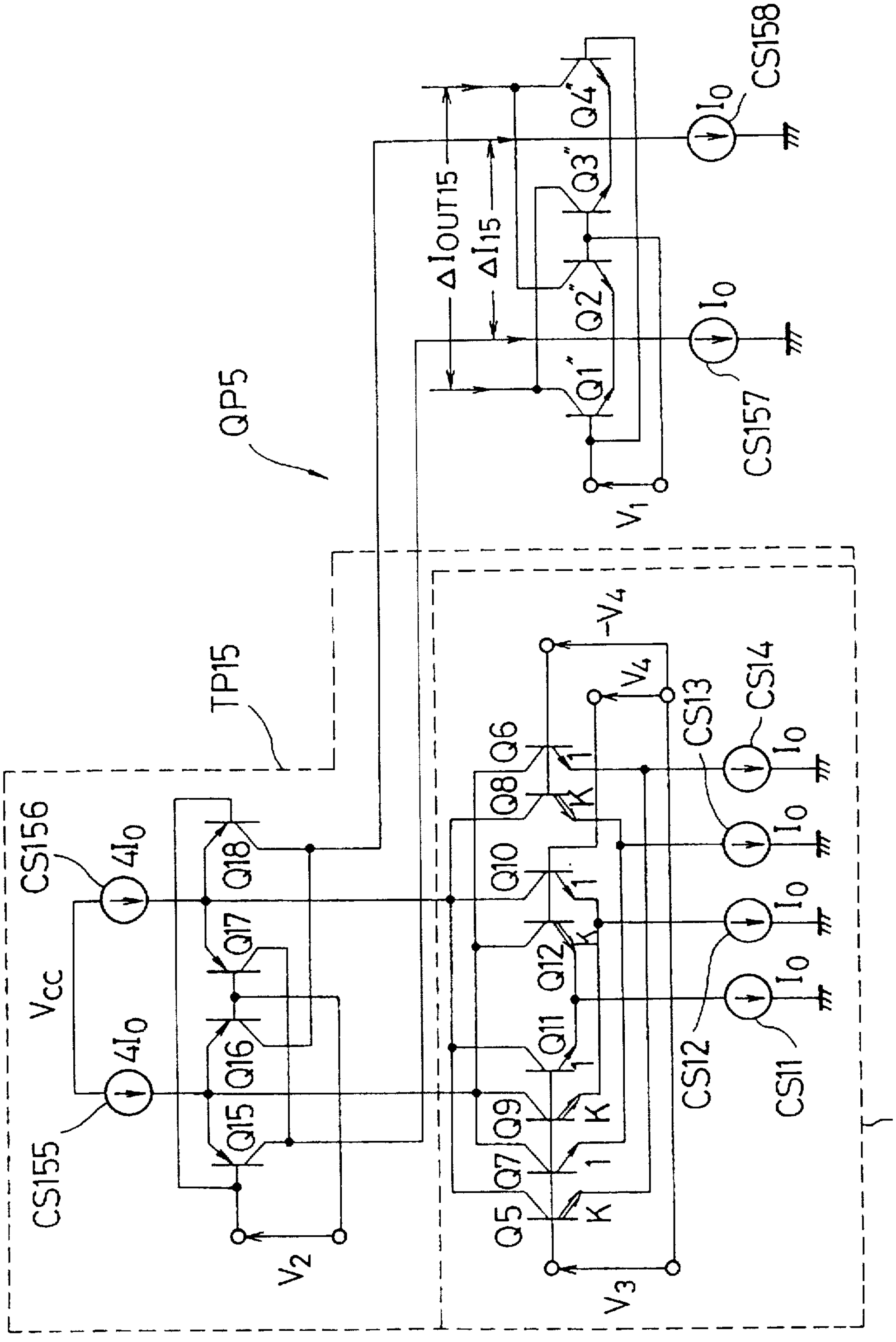
FIG. 15 is a circuit diagram of a quadrupler according to a tenth embodiment of the invention.

FIG. 15 shows a quadrupler QP5 according to a tenth embodiment of the invention.

As shown in FIG. 14, the quadrupler QP4 has first and second emitter-coupled pairs of npn bipolar transistors Q1", Q2", Q3" and Q4", which are driven by constant current sources CS157 and CS158 (current: $I_0$), respectively. The first and second emitter-coupled pairs are driven by a differential output current $\Delta I_{15}$ of a tripler TP15.

A differential output current $\Delta I_{OUT15}$ of the quadrupler QP5 is derived from collectors coupled of the transistors Q12 and Q3" and the collectors coupled of the transistors Q2" and Q4".

The tripler TP15 contains third and fourth emitter-coupled pairs of npn bipolar transistors Q15 and Q16, and Q17 and Q18, and a multiplier MP15. The third and fourth emitter-coupled pairs are driven by constant current sources CS155 and CS156 (current: $4I_0$), respectively. The current sources CS155 and CS156 are applied with a power source voltage $V_{CC}$.

The second input voltage $V_2$ is applied across bases coupled of the transistors Q15 and Q18 and bases coupled of the transistors Q16 and Q17.

The multiplier MP15 is the same in configuration as the multiplier MP12. The emitters coupled of the transistors Q15 and Q16 are connected to the collectors coupled of the transistors Q7, Q9, Q12 and Q6, and the emitters coupled of the transistors Q17 and Q18 are connected to the collectors coupled of the transistors Q5, Q11, Q10 and Q8.

The differential output current $\Delta I_{OUT15}$ of the quadrupler QP5 can be expressed by the following equation (26) as $$\Delta I_{OUT15} = 2\alpha_{Fp}\alpha_{Fn}^2 I_0 \tanh\left(\frac{V_1}{2V_T}\right)\tanh\left(\frac{V_2}{2V_T}\right)\{K-(1/K)\} \times \left\{\frac{1}{2\cosh\{(V_3+V_4)/V_T\}+K+(1/K)} - \frac{1}{2\cosh\{(V_3-V_4)/V_T\}+K+(1/K)}\right\} \qquad (26)$$

$$(|V_1| < 2V_T, |V_2| < 2V_T, |V_3| < 2V_T, |V_4| < 2V_T)$$

The equation (26) can be approximated as $$\Delta I_{OUT12} \approx \frac{-2\alpha_{Fn}\alpha_{Fp} I_0\{K-(1/K)\}}{\{K+(1/K)+2\}^2} \times \left(\frac{V_1V_2V_3V_4}{V_T^4}\right) \qquad (27)$$

$$(A < 1, B < 1)$$

It is seen from the equation (27) that the current $\Delta I_{OUT15}$

It is seen from the equation (27) that the current $\Delta I_{OUT15}$ is approximately proportional to the product or multiplication result of the four input voltage $V_1$, $V_2$, $V_3$ and $V_4$.

In the tripler TP15, since no stage is vertically stacked on the stage of the multiplier MP15, the quadrupler QP5 can operate at a power source voltage of about 2 V, which is satisfied with the demand for the power source voltage of 3 V or less.

Eleventh Embodiment

Figure 16:
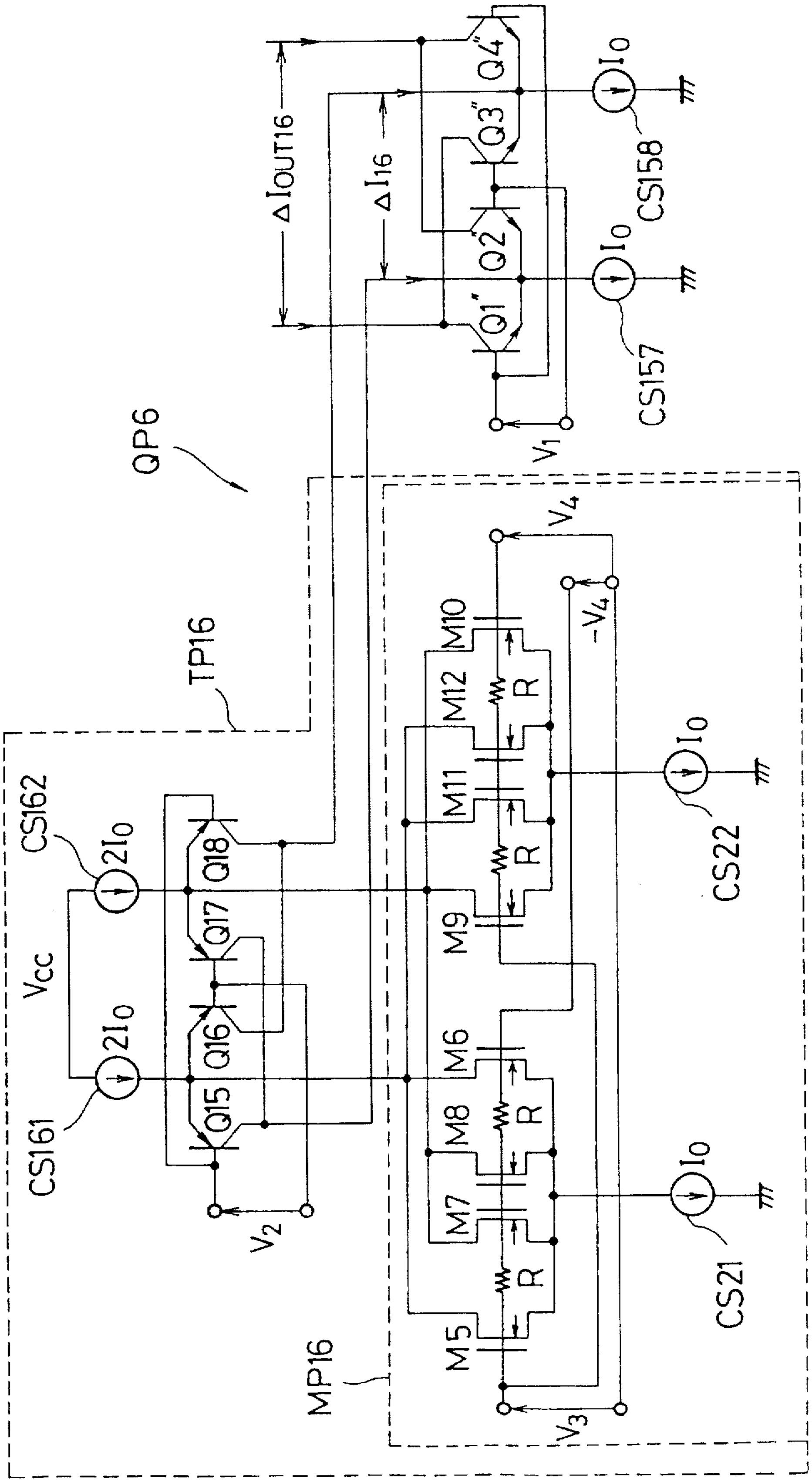
FIG. 16 is a circuit diagram of a quadrupler according to an eleventh embodiment of the invention.

FIG. 16 shows a quadrupler QP6 according to a eleventh embodiment of the invention.

As shown in FIG. 16, the quadrupler QP6 has the same first and second emitter-coupled pairs of npn bipolar transistors Q1", Q2", Q3" and Q4" which are driven by constant current sources CS157 and CS158 (current: $I_0$), respectively. The first and second emitter-coupled pairs are driven by a differential output current $\Delta I_{16}$ of a tripler TP16.

A differential output current $\Delta I_{OUT16}$ of the quadrupler QP6 is derived from collectors coupled of the transistors Q1" and Q3" and the collectors coupled of the transistors Q2" and Q4".

The tripler TP16 contains third and fourth emitter-coupled pairs of npn bipolar transistors Q15 and Q16, and Q17 and Q18, and a multiplier MP16. The third and fourth emitter-coupled pairs are substantially the same in configuration as those of the tenth embodiment shown in FIG. 15 excepting that they are driven by constant current sources CS161 and CS162 (current: $2I_0$), respectively. The current sources CS161 and CS162 are applied with a power source voltage $V_{CC}$.

The second input voltage $V_2$ is applied across bases coupled of the transistors Q15 and Q18 and bases coupled of the transistors Q16 and Q17.

The multiplier MP16 is the same in configuration as the multiplier MP13 shown in FIG. 13. The emitters coupled of the transistors Q15 and Q16 are connected to the drains coupled of the MOS transistors M5, M6, Q11 and M12, and the emitters coupled of the transistors Q17 and Q18 are connected to the drains coupled or the transistors M7, M8, M9 and M10.

The differential output current $\Delta I_{OUT16}$ of the quadrupler QP6 can be expressed by the following equation (28) in the limited ranges of the third and fourth input voltages $V_3$ and $V_4$ as $$\Delta I_{OUT16} = 2\alpha_{FP}\alpha_{Fn}\beta\tanh\left(\frac{V_1}{2V_T}\right)\tanh\left(\frac{V_2}{2V_T}\right)V_3V_4 \quad (28)$$

$$\left(|V_3 \pm V_4| \leqq \sqrt{\left(\frac{2I_0}{3\beta}\right)}\right)$$

It is seen from the equation (28) that the current $\Delta I_{OUT16}$ is approximately proportional to the product or multiplication result of the four input voltage $V_1$, $V_2$, $V_3$ and $V_4$.

In the tripler TP16, since no stage is vertically stacked on the stage of the multiplier MP16, the quadrupler QP6 can operate at a power source voltage of about 2 V, which is satisfied with the demand for the power source voltage of 3 V or less.

Any other multipliers with differential output currents may be used in the ninth to eleventh embodiments. For example, multipliers disclosed in the Japanese Non-Examined Patent Publication No. 3-210683 (1991), 4-34673 (1992), 4-309190 (1992), the Japanese Patent Application No. 5-176025 (1993) and 5-19358 (1993). The Japanese Patent Application No. 5-19358 is corresponding to the U.S. patent application Ser. No. 08/179,955.

The invention is also disclosed in detail in IEEE Transactions on Circuits and Systems, Vol. 41, No. 5, pp. 411–423, May 1994, entitled "Some Circuit Design Techniques Using Two Cross-Coupled, Emitter-Coupled Pairs", which was written by the inventor.

While the preferred forms of the present invention have been described, it is to be understood that modifications will be apparent to those skilled in the art without departing from the spirit of the invention. The scope of the invention, therefore, is to be determined solely by the following claims.

What is claimed is:

1. A tripler comprising:

(a) a first pair of first and second bipolar transistors whose emitters are coupled together;

(b) a second pair of third and fourth bipolar transistors whose emitters are coupled together;

bases of said first and fourth transistors being coupled together to form one of a first pair of input-terminals, and bases of said second and third transistors being coupled together to form the other of said first pair of input terminals;

collectors of said first and third transistors being coupled together to form one of a pair of output terminals of said tripler, and collectors of said second and fourth transistors being coupled together to form the other of said pair of output terminals;

wherein a first input voltage is applied across said first pair of input terminals, a differential output current of said tripler serving as an output of said tripler being outputted from said pair of output terminals;

(c) a multiplier for driving said coupled emitters of said first and second pairs of bipolar transistors;

said multiplier having a second pair of input terminals, a third pair of input terminals, and a pair of output terminals, a second input voltage being applied across said second pair of input terminals, a third input voltage being applied across said third pair of input terminals;

said pair of output terminals of said multiplier being connected to said coupled emitters of said first and second transistors and said coupled emitters of said third and fourth transistors, respectively, said differential output current of said multiplier being proportional to the product of said second and third input voltages;

(d) wherein said differential output current of said tripler is proportional to the product of said first, second and third input voltages;

(e) and wherein said second input voltage is applied across said second pair of input terminals of said multiplier with respect to a dc reference voltage, and said third input voltage is applied across said third pair of input terminals of said multiplier with respect to said dc reference voltage;

(f) and wherein said multiplier comprises eight bipolar transistors arranged into a first, second, and third transistor group, bases of all said bipolar transistors within a given said transistor group being electrically connected to one another and electrically connected to one input terminal of said second and third pairs of input terminals, said first transistor group comprising four said bipolar transistors, said second and third transistor groups each comprising two said bipolar transistors, respectively.

2. A tripler comprising:

(a) a first pair of first and second bipolar transistors whose emitters are coupled together;

(b) a second pair of third and fourth bipolar transistors whose emitters are coupled together;

bases of said first and fourth transistors being coupled together to form one of a first pair of input terminals of said tripler, and bases of said second and third transistors being coupled together to form the other of said first pair of input terminals;

a first input voltage being applied across said first pair of input terminals;

collectors of said first and third transistors being coupled together to form one of a pair of output terminals of said tripler, and collectors of said second and fourth transistors being coupled together to form the other of said pair of output terminals;

a differential output current of said tripler serving as an output of said tripler being outputted from said pair of output terminals;

(c) a multiplier for driving said first and second pairs by said differential output current;

said multiplier having a second pair of input terminals, a third pair of input terminals, and a pair of output terminals, a second input voltage being applied across said second pair of input terminals, a third input voltage being applied across said third pair of input terminals;

said pair of output terminals of said multiplier being connected to said coupled emitters of said first and second transistors and those of said third and fourth transistors, respectively, said differential output current of said multiplier being proportional to the product of said second and third input voltages;

(d) wherein said differential output current of said tripler is proportional to the product of said first, second and third input voltages;

(e) and wherein said second input voltage is applied across said second input terminals of said multiplier with respect to a dc reference voltage, and said third input voltage is applied across said third input terminals of said multiplier with respect to said dc reference voltage;

(f) and wherein said multiplier comprises eight MOS transistors arranged into a first and second transistor group, gates of said MOS transistors of respective said first and second transistor groups being electrically interconnected through at least one resistor, said second input voltage being applied across said interconnected gates of said first transistor group, said third input voltage being applied across said interconnected gates of said second transistor group.

3. A tripler comprising:

(a) a first pair of first and second bipolar transistors whose emitters are coupled together;

(b) a second pair of third and fourth bipolar transistors whose emitters are coupled together;

bases of said first and fourth transistors being coupled together to form one of a first pair of input terminals, and bases of said second and third transistors being coupled together to form the other of said first pair of input terminals;

collectors of said first and third transistors being coupled together to form one of a pair of output terminals of said tripler, and collectors of said second and fourth transistors being coupled together to form the other of said pair of output terminals;

wherein a first input voltage is applied across said first pair of input terminals, a differential output current of said tripler serving as an output of said tripler being outputted from said pair of output terminals;

(c) a first constant current source for driving said first pair of first and second bipolar transistors;

(d) a second constant current source for driving said second pair of third and fourth bipolar transistors;

(e) a multiplier for driving said coupled emitters of said first and second pairs of bipolar transistors;

said multiplier having a second pair of input terminals, a third pair of input terminals, and a pair of output terminals, a second input voltage being applied across said second pair of input terminals, a third input voltage being applied across said third pair of input terminals;

said pair of output terminals of said multiplier being connected to said coupled emitters of said first and second transistors and said coupled emitters of said third and fourth transistors, respectively;

said differential output current of said multiplier being proportional to the product of said second and third input voltages;

(f) wherein said differential output current of said tripler is proportional to the product of said first, second and third input voltages;

(g) and wherein said multiplier comprises eight bipolar transistors arranged into a first, second, and third transistor group, bases of all said bipolar transistors within a given said transistor group being electrically connected to one another and electrically connected to one input terminal of said second and third pairs of input terminals, said first transistor group comprising four said bipolar transistors, said second and third transistor groups each comprising two said bipolar transistors, respectively.

4. A tripler comprising:

(a) a first pair of first and second bipolar transistors whose emitters are coupled together;

(b) a second pair of third and fourth bipolar transistors whose emitters are coupled together;

bases of said first and fourth transistors being coupled together to form one of a first pair of input terminals, and bases of said second and third transistors being coupled together to form the other of said first pair of input terminals;

collectors of said first and third transistors being coupled together to form one of a pair of output terminals of said tripler, and collectors of said second and fourth transistors being coupled together to form the other of said pair of output terminals;

wherein a first input voltage is applied across said first pair of input terminals, a differential output current of said tripler serving as an output of said tripler being outputted from said pair of output terminals;

(c) a first constant current source for driving said first pair of first and second bipolar transistors;

(d) a second constant current source for driving said second pair of third and fourth bipolar transistors;

(e) a multiplier for driving said coupled emitters of said first and second pairs of bipolar transistors;

said multiplier having a second pair of input terminals, a third pair of input terminals, and a pair of output terminals, a second input voltage being applied across said second pair of input terminals, a third input voltage being applied across said third pair of input terminals;

said pair of output terminals of said multiplier being connected to said coupled emitters of said first and second transistors and said coupled emitters of said third and fourth transistors, respectively;

said differential output current of said multiplier being proportional to the product of said second and third input voltages;

(f) wherein said differential output current of said tripler is proportional to the product of said first, second and third input voltages;

(g) and wherein said multiplier comprises eight MOS transistors arranged into a first and second transistor group, gates of said MOS transistors of respective said first and second transistor groups being electrically interconnected through at least one resistor, said second input voltage being applied across said interconnected gates of said first transistor group, said third input voltage being applied across said interconnected gates of said second transistor group.

* * * * *

UNITED STATES PATENT AND TRADEMARK OFFICE

CERTIFICATE OF CORRECTION

PATENT NO. : 5,767,727

DATED : June 16, 1998

INVENTOR(S) : Katsuji KIMURA

It is certified that error appears in the above-indentified patent and that said Letters Patent is hereby corrected as shown below:

On the cover page, in the title of the invention, Item [54], change "TRIPPLER" to --TRIPLER--.

Signed and Sealed this

Eighteenth Day of August, 1998

Attest:

BRUCE LEHMAN

*Attesting Officer*

*Commissioner of Patents and Trademarks*